United States Patent
Yuan et al.

(10) Patent No.: US 12,240,431 B2
(45) Date of Patent: Mar. 4, 2025

(54) ACTIVATION OF PRIMARY AND SECONDARY BRAKE SYSTEMS FOR AUTONOMOUS VEHICLES

(71) Applicant: Baidu USA LLC, Sunnyvale, CA (US)

(72) Inventors: Baoping Yuan, Sunnyvale, CA (US); Tianjia Sun, Sunnyvale, CA (US); Yaoming Shen, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 230 days.

(21) Appl. No.: 17/952,112

(22) Filed: Sep. 23, 2022

(65) Prior Publication Data
US 2024/0101079 A1 Mar. 28, 2024

(51) Int. Cl.
*B60T 7/12* (2006.01)
*B60T 8/88* (2006.01)
(Continued)

(52) U.S. Cl.
CPC ............... *B60T 7/12* (2013.01); *B60T 8/885* (2013.01); *B60T 8/92* (2013.01); *B60T 17/22* (2013.01);
(Continued)

(58) Field of Classification Search
CPC ... B60T 7/12; B60T 8/885; B60T 8/92; B60T 17/22; B60T 2210/12; B60T 2210/20; B60T 2210/32; B60T 2250/00; B60T 2250/02; B60T 2250/04; B60T 2270/402; B60T 2270/404; B60T 2270/406; B60T 2270/413; B60T 2270/82; B60W 10/04; B60W 10/06; B60W 10/10; B60W 10/18; B60W 10/20; B60W 30/18109; B60W 60/001; B60W 60/0016; B60W 2510/18; B60W 2520/10; B60W 2530/10; B60W 2540/01; B60W 2552/15; B60W 2552/40; B60W 2555/20;
(Continued)

(56) References Cited

U.S. PATENT DOCUMENTS 10,106,141 B2 * 10/2018 Heil .................... B60T 8/885
10,501,064 B2 * 12/2019 Pinto, IV ............... B60T 7/22
(Continued)

FOREIGN PATENT DOCUMENTS

CA 3181484 A1 * 12/2021 ............. B60T 1/062
CA 3231887 A1 * 1/2023 ............ B60T 13/586
(Continued)

*Primary Examiner* — Atul Trivedi
(74) *Attorney, Agent, or Firm* — WOMBLE BOND DICKINSON (US) LLP

(57) ABSTRACT

In one embodiment, a system determines activation parameters for an autonomous driving vehicle (ADV), where the activation parameters include historical usages of a primary brake system or a secondary brake system. In response to determining that a brake is to be applied, the system determines whether to activate a primary or a secondary brake system based on the activation parameters. The system sends an activation flag to activate the primary or the secondary brake system based on the determining whether to activate the primary or the secondary brake system. The system sends a brake command to the primary and the secondary brake system to activate either the primary or the secondary brake system according to the activation flag.

20 Claims, 22 Drawing Sheets

(51) Int. Cl.
   *B60T 8/92* (2006.01)
   *B60T 17/22* (2006.01)
   *B60W 10/06* (2006.01)
   *B60W 10/10* (2012.01)
   *B60W 10/18* (2012.01)
   *B60W 10/20* (2006.01)
   *B60W 30/18* (2012.01)
   *B60W 60/00* (2020.01)

(52) U.S. Cl.
   CPC ............ *B60W 10/06* (2013.01); *B60W 10/10* (2013.01); *B60W 10/18* (2013.01); *B60W 10/20* (2013.01); *B60W 30/18109* (2013.01); *B60W 60/0016* (2020.02); *B60T 2210/12* (2013.01); *B60T 2210/20* (2013.01); *B60T 2210/32* (2013.01); *B60T 2250/00* (2013.01); *B60T 2250/02* (2013.01); *B60T 2250/04* (2013.01); *B60T 2270/402* (2013.01); *B60T 2270/404* (2013.01); *B60T 2270/406* (2013.01); *B60T 2270/413* (2013.01); *B60T 2270/82* (2013.01); *B60W 2510/18* (2013.01); *B60W 2520/10* (2013.01); *B60W 2530/10* (2013.01); *B60W 2540/01* (2020.02); *B60W 2552/15* (2020.02); *B60W 2552/40* (2020.02); *B60W 2555/20* (2020.02); *B60W 2710/0605* (2013.01); *B60W 2710/10* (2013.01); *B60W 2710/18* (2013.01); *B60W 2710/20* (2013.01)

(58) Field of Classification Search
   CPC ..... B60W 2556/40; B60W 2710/0605; B60W 2710/10; B60W 2710/18; B60W 2710/20
   USPC .......................................................... 701/41
   See application file for complete search history.

(56) References Cited

U.S. PATENT DOCUMENTS

| | | | | |
|---|---|---|---|---|
| 2003/0075978 | A1* | 4/2003 | Riddiford | F16H 63/48 303/112 |
| 2017/0217419 | A1* | 8/2017 | Yen | B60T 7/042 |
| 2017/0307036 | A1* | 10/2017 | Nuesser | F16D 66/021 |
| 2018/0244271 | A1* | 8/2018 | Krueger | B60W 60/00182 |
| 2018/0297573 | A1* | 10/2018 | Alam | B60T 17/221 |
| 2018/0345795 | A1 | 12/2018 | Luke et al. | |
| 2019/0066399 | A1* | 2/2019 | Jiang | G07C 5/008 |
| 2019/0084537 | A1* | 3/2019 | Kasper | B60T 8/17551 |
| 2021/0049444 | A1* | 2/2021 | Bielby | G07C 5/0808 |
| 2021/0164786 | A1* | 6/2021 | Young | G06F 16/909 |
| 2021/0166719 | A1* | 6/2021 | Young | G10L 19/00 |
| 2021/0179057 | A1* | 6/2021 | Shingai | B60T 7/22 |
| 2021/0261161 | A1* | 8/2021 | Schlimme | B60L 15/2009 |
| 2021/0269000 | A1* | 9/2021 | Broyles | B60W 30/146 |
| 2021/0339728 | A1* | 11/2021 | Gaughan | B60T 13/665 |
| 2022/0144058 | A1* | 5/2022 | Ben-Ari | F16D 1/10 |
| 2022/0185246 | A1* | 6/2022 | Szuck | G06N 20/00 |
| 2022/0185274 | A1* | 6/2022 | Singh | B60T 7/12 |
| 2022/0242424 | A1* | 8/2022 | Saenz | B60W 50/12 |
| 2022/0258644 | A1* | 8/2022 | Hanchett | G01C 21/3617 |
| 2022/0289199 | A1* | 9/2022 | Sun | B60W 60/00186 |
| 2022/0383421 | A1* | 12/2022 | Grivel | G06Q 40/08 |
| 2023/0111391 | A1* | 4/2023 | Nayak | B60Q 1/525 701/301 |
| 2023/0169802 | A1* | 6/2023 | Robinson | G07C 5/04 701/31.9 |
| 2023/0211817 | A1* | 7/2023 | Tripathy | B61L 25/04 246/182 R |
| 2023/0322208 | A1* | 10/2023 | Rojas | B60W 10/20 701/41 |
| 2023/0373455 | A1* | 11/2023 | Salter | B60T 7/18 |
| 2023/0376343 | A1* | 11/2023 | Stoppa | G06F 9/4812 |
| 2024/0101081 | A1* | 3/2024 | Yuan | B60W 60/0015 |

FOREIGN PATENT DOCUMENTS

| | | | | |
|---|---|---|---|---|
| CN | 112706736 A | * | 4/2021 | ............ B60T 13/745 |
| DE | 102020124590 A1 | * | 4/2021 | ............ B60T 13/745 |
| DE | 102018100148 B4 | * | 1/2022 | ............. B60T 17/22 |
| DE | 102021205091 A1 | * | 11/2022 | ............ B60T 17/221 |
| JP | 2023508083 A | * | 2/2023 | ............... G08G 1/16 |
| WO | WO-2019055712 A1 | * | 3/2019 | ............... B60T 7/20 |
| WO | WO-2019055714 A1 | * | 3/2019 | ............. B60D 1/245 |
| WO | WO-2022040713 A1 | * | 3/2022 | ............. F16D 65/16 |
| WO | WO-2024078707 A1 | * | 4/2024 | |

* cited by examiner

| Scenario | Driving Direction | Primary ADS | Secondary ADS | Primary CDC | Secondary CDC | Vehicle at Front | Pedestrian at Front | Vehicle Following Behind | Brake Mode |
|---|---|---|---|---|---|---|---|---|---|
| 1 | Forward | F3/F4 | F0/F1/F2 | F0/F1/F2/F3/F4 | F0/F1/F2/F3/F4 | Yes, closeby | Yes, closeby | Yes, closeby | Sharp |
| 2 | Forward | F3/F4 | F0/F1/F2 | F0/F1/F2/F3/F4 | F0/F1/F2/F3/F4 | Yes, closeby | Yes, closeby | Yes, far away | Sharp |
| 3 | Forward | F3/F4 | F0/F1/F2 | F0/F1/F2/F3/F4 | F0/F1/F2/F3/F4 | Yes, closeby | Yes, far away | Yes, closeby | Gradual |
| 4 | Forward | F3/F4 | F0/F1/F2 | F0/F1/F2/F3/F4 | F0/F1/F2/F3/F4 | Yes, closeby | Yes, far away | Yes, closeby | Gradual |
| 5 | Forward | F3/F4 | F0/F1/F2 | F0/F1/F2/F3/F4 | F0/F1/F2/F3/F4 | Yes, and braking sharply | Yes, closeby | Yes, closeby | Sharp |
| 6 | Forward | F3/F4 | F0/F1/F2 | F0/F1/F2/F3/F4 | F0/F1/F2/F3/F4 | Yes, and braking sharply | Yes, closeby | Yes, far away | Sharp |
| 7 | Forward | F3/F4 | F0/F1/F2 | F0/F1/F2/F3/F4 | F0/F1/F2/F3/F4 | Yes, and braking sharply | Yes, far away | Yes, closeby | Sharp |
| 8 | Forward | F3/F4 | F0/F1/F2 | F0/F1/F2/F3/F4 | F0/F1/F2/F3/F4 | Yes, and braking sharply | Yes, far away | Yes, far away | Sharp |
| 9 | Forward | F3/F4 | F0/F1/F2 | F0/F1/F2/F3/F4 | F0/F1/F2/F3/F4 | Yes, and braking gradually | Yes, closeby | Yes, closeby | Sharp |
| 10 | Forward | F3/F4 | F0/F1/F2 | F0/F1/F2/F3/F4 | F0/F1/F2/F3/F4 | Yes, and braking gradually | Yes, closeby | Yes, far away | Sharp |
| 11 | Forward | F3/F4 | F0/F1/F2 | F0/F1/F2/F3/F4 | F0/F1/F2/F3/F4 | Yes, and braking gradually | Yes, far away | Yes, closeby | Gradual |
| 12 | Forward | F3/F4 | F0/F1/F2 | F0/F1/F2/F3/F4 | F0/F1/F2/F3/F4 | Yes, and braking gradually | Yes, far away | Yes, far away | Gradual |

| Scenario | Driving Direction | Primary ADS | Secondary ADS | Primary CDC | Secondary CDC | Vehicle at Front | Pedestrian at Front | Vehicle Following Behind | Brake Mode |
|---|---|---|---|---|---|---|---|---|---|
| 13 | Forward | F3/F4 | F0/F1/F2 | F3/F4 | F0/F1/F2 | Yes, closeby | Yes, closeby | Yes, closeby | Sharp |
| 14 | Forward | F3/F4 | F0/F1/F2 | F3/F4 | F0/F1/F2 | Yes, closeby | Yes, closeby | Yes, far away | Sharp |
| 15 | Forward | F3/F4 | F0/F1/F2 | F3/F4 | F0/F1/F2 | Yes, closeby | Yes, far away | Yes, closeby | Gradual |
| 16 | Forward | F3/F4 | F0/F1/F2 | F3/F4 | F0/F1/F2 | Yes, closeby | Yes, far away | Yes, far away | Gradual |
| 17 | Forward | F3/F4 | F0/F1/F2 | F3/F4 | F0/F1/F2 | Yes, and braking sharply | Yes, closeby | Yes, closeby | Sharp |
| 18 | Forward | F3/F4 | F0/F1/F2 | F3/F4 | F0/F1/F2 | Yes, and braking sharply | Yes, closeby | Yes, far away | Sharp |
| 19 | Forward | F3/F4 | F0/F1/F2 | F3/F4 | F0/F1/F2 | Yes, and braking sharply | Yes, far away | Yes, closeby | Sharp |
| 20 | Forward | F3/F4 | F0/F1/F2 | F3/F4 | F0/F1/F2 | Yes, and braking sharply | Yes, far away | Yes, far away | Sharp |
| 21 | Forward | F3/F4 | F0/F1/F2 | F3/F4 | F0/F1/F2 | Yes, and braking gradually | Yes, closeby | Yes, closeby | Sharp |
| 22 | Forward | F3/F4 | F0/F1/F2 | F3/F4 | F0/F1/F2 | Yes, and braking gradually | Yes, closeby | Yes, far away | Sharp |
| 23 | Forward | F3/F4 | F0/F1/F2 | F3/F4 | F0/F1/F2 | Yes, and braking gradually | Yes, far away | Yes, closeby | Gradual |
| 24 | Forward | F3/F4 | F0/F1/F2 | F3/F4 | F0/F1/F2 | Yes, and braking gradually | Yes, far away | Yes, far away | Gradual |

FIG. 8B

| Scenario | Driving Direction | Primary ADS | Secondary ADS | Primary CDC | Secondary CDC | Vehicle at Front | Pedestrian at Front | Vehicle Following Behind | Brake Mode |
|---|---|---|---|---|---|---|---|---|---|
| 25 | Forward | F0/F1/F2 | F0/F1/F2/F3/F4 | F0/F1/F2 | F3/F4 | Yes, closeby | Yes, closeby | Yes, closeby | Sharp |
| 26 | Forward | F0/F1/F2 | F0/F1/F2/F3/F4 | F0/F1/F2 | F3/F4 | Yes, closeby | Yes, closeby | Yes, far away | Sharp |
| 27 | Forward | F0/F1/F2 | F0/F1/F2/F3/F4 | F0/F1/F2 | F3/F4 | Yes, closeby | Yes, far away | Yes, closeby | Gradual |
| 28 | Forward | F0/F1/F2 | F0/F1/F2/F3/F4 | F0/F1/F2 | F3/F4 | Yes, closeby | Yes, far away | Yes, far away | Gradual |
| 29 | Forward | F0/F1/F2 | F0/F1/F2/F3/F4 | F0/F1/F2 | F3/F4 | Yes, and braking sharply | Yes, closeby | Yes, closeby | Sharp |
| 30 | Forward | F0/F1/F2 | F0/F1/F2/F3/F4 | F0/F1/F2 | F3/F4 | Yes, and braking sharply | Yes, closeby | Yes, far away | Sharp |
| 31 | Forward | F0/F1/F2 | F0/F1/F2/F3/F4 | F0/F1/F2 | F3/F4 | Yes, and braking sharply | Yes, far away | Yes, closeby | Sharp |
| 32 | Forward | F0/F1/F2 | F0/F1/F2/F3/F4 | F0/F1/F2 | F3/F4 | Yes, and braking sharply | Yes, far away | Yes, far away | Sharp |
| 33 | Forward | F0/F1/F2 | F0/F1/F2/F3/F4 | F0/F1/F2 | F3/F4 | Yes, and braking gradually | Yes, closeby | Yes, closeby | Sharp |
| 34 | Forward | F0/F1/F2 | F0/F1/F2/F3/F4 | F0/F1/F2 | F3/F4 | Yes, and braking gradually | Yes, closeby | Yes, far away | Sharp |
| 35 | Forward | F0/F1/F2 | F0/F1/F2/F3/F4 | F0/F1/F2 | F3/F4 | Yes, and braking gradually | Yes, far away | Yes, closeby | Gradual |
| 36 | Forward | F0/F1/F2 | F0/F1/F2/F3/F4 | F0/F1/F2 | F3/F4 | Yes, and braking gradually | Yes, far away | Yes, far away | Gradual |

| Scenario | Driving Direction | Primary ADS | Secondary ADS | Primary CDC | Secondary CDC | Vehicle at Front | Pedestrian at Front | Vehicle Following Behind | Brake Mode |
|---|---|---|---|---|---|---|---|---|---|
| 37 | Forward | F0/F1/F2 | F0/F1/F2/F3/F4 | F3/F4 | F0/F1/F2 | Yes, closeby | Yes, closeby | Yes, closeby | Sharp |
| 38 | Forward | F0/F1/F2 | F0/F1/F2/F3/F4 | F3/F4 | F0/F1/F2 | Yes, closeby | Yes, closeby | Yes, far away | Sharp |
| 39 | Forward | F0/F1/F2 | F0/F1/F2/F3/F4 | F3/F4 | F0/F1/F2 | Yes, closeby | Yes, far away | Yes, closeby | Gradual |
| 40 | Forward | F0/F1/F2 | F0/F1/F2/F3/F4 | F3/F4 | F0/F1/F2 | Yes, closeby | Yes, far away | Yes, far away | Gradual |
| 41 | Forward | F0/F1/F2 | F0/F1/F2/F3/F4 | F3/F4 | F0/F1/F2 | Yes, and braking sharply | Yes, closeby | Yes, closeby | Sharp |
| 42 | Forward | F0/F1/F2 | F0/F1/F2/F3/F4 | F3/F4 | F0/F1/F2 | Yes, and braking sharply | Yes, closeby | Yes, far away | Sharp |
| 43 | Forward | F0/F1/F2 | F0/F1/F2/F3/F4 | F3/F4 | F0/F1/F2 | Yes, and braking sharply | Yes, far away | Yes, closeby | Sharp |
| 44 | Forward | F0/F1/F2 | F0/F1/F2/F3/F4 | F3/F4 | F0/F1/F2 | Yes, and braking sharply | Yes, far away | Yes, far away | Sharp |
| 45 | Forward | F0/F1/F2 | F0/F1/F2/F3/F4 | F3/F4 | F0/F1/F2 | Yes, and braking gradually | Yes, closeby | Yes, closeby | Sharp |
| 46 | Forward | F0/F1/F2 | F0/F1/F2/F3/F4 | F3/F4 | F0/F1/F2 | Yes, and braking gradually | Yes, closeby | Yes, far away | Sharp |
| 47 | Forward | F0/F1/F2 | F0/F1/F2/F3/F4 | F3/F4 | F0/F1/F2 | Yes, and braking gradually | Yes, far away | Yes, closeby | Gradual |
| 48 | Forward | F0/F1/F2 | F0/F1/F2/F3/F4 | F3/F4 | F0/F1/F2 | Yes, and braking gradually | Yes, far away | Yes, far away | Gradual |

| Scenario | Driving Direction | Primary ADS | Sec. ADS | Primary CDC | Secondary CDC | Vehicle at Front | Pedestrian at Front | Vehicle Following Behind | Brake Mode |
|---|---|---|---|---|---|---|---|---|---|
| 49 | Forward | F3/F4 | F3/F4 | F0/F1/F2 | F0/F1/F2/F3/F4 | Yes/No | Yes/No | Yes/No | Sharp (MCU, CDC) |
| 50 | Forward | F3/F4 | F3/F4 | F3/F4 | F0/F1/F2 | Yes/No | Yes/No | Yes/No | Sharp (MCU, CDC) |
| 51 | Forward | F0/F1/F2/F3/F4 | F0/F1/F2/F3/F4 | F3/F4 | F3/F4 | Yes/No | Yes/No | Yes/No | Sharp (CDC) |

| Failure Levels | Description |
|---|---|
| F0 | No failure, failure-free operation |
| F1 | Have failures, but does not affect AD system, can show warning. |
| F2 | Have failures, affects the AD system, and vehicular speed needs to be degraded. |
| F3 | Have failures, affects the AD system, and need to stop the vehicle. |
| F4 | Have failures, affects the AD system, and need to stop the vehicle immediately. |

FIG. 8F

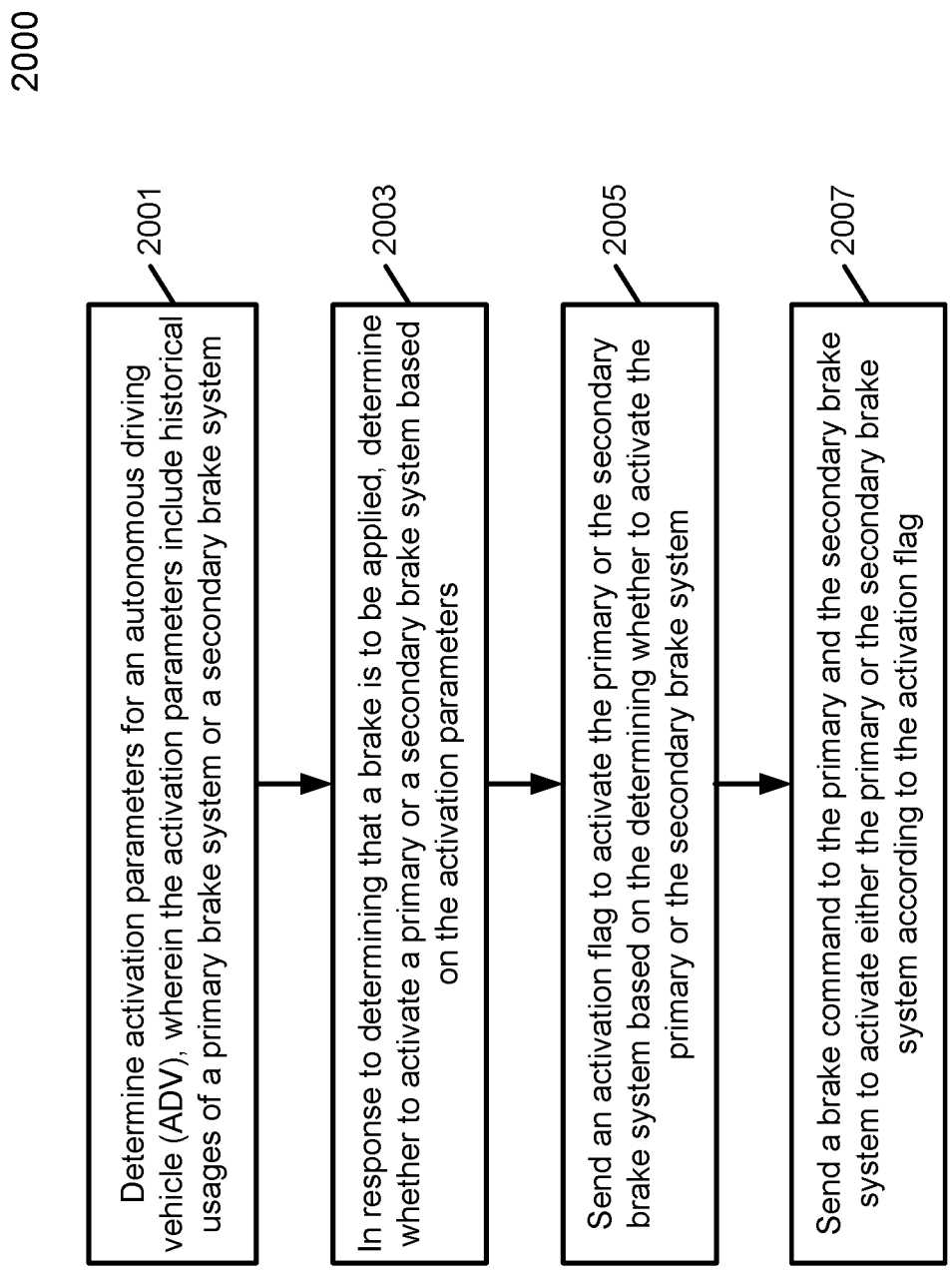

a# ACTIVATION OF PRIMARY AND SECONDARY BRAKE SYSTEMS FOR AUTONOMOUS VEHICLES

TECHNICAL FIELD

Embodiments of the present disclosure relate generally to operating autonomous driving vehicles. More particularly, embodiments of the disclosure relate to activation of the primary and the secondary brake systems for autonomous vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Brake control is a critical operation in autonomous driving. Deceleration/pressure requests from the autonomous driving system (ADS) should be delivered to a brake system without faults.

BRIEF DESCRIPTION OF THE DRAWINGS

Embodiments of the disclosure are illustrated by way of example and not limitation in the figures of the accompanying drawings in which like references indicate similar elements.

FIGS. 8A-8E are block diagrams illustrating a mapping table for brake mode selection according to one embodiment.

FIG. 8F is a block diagram illustrating a legend of failure levels for the brake mode selection according to one embodiment.

FIG. 15 is a flow diagram illustrating a method to activate a primary or a second system according to one embodiment.

DETAILED DESCRIPTION

Figure 1:
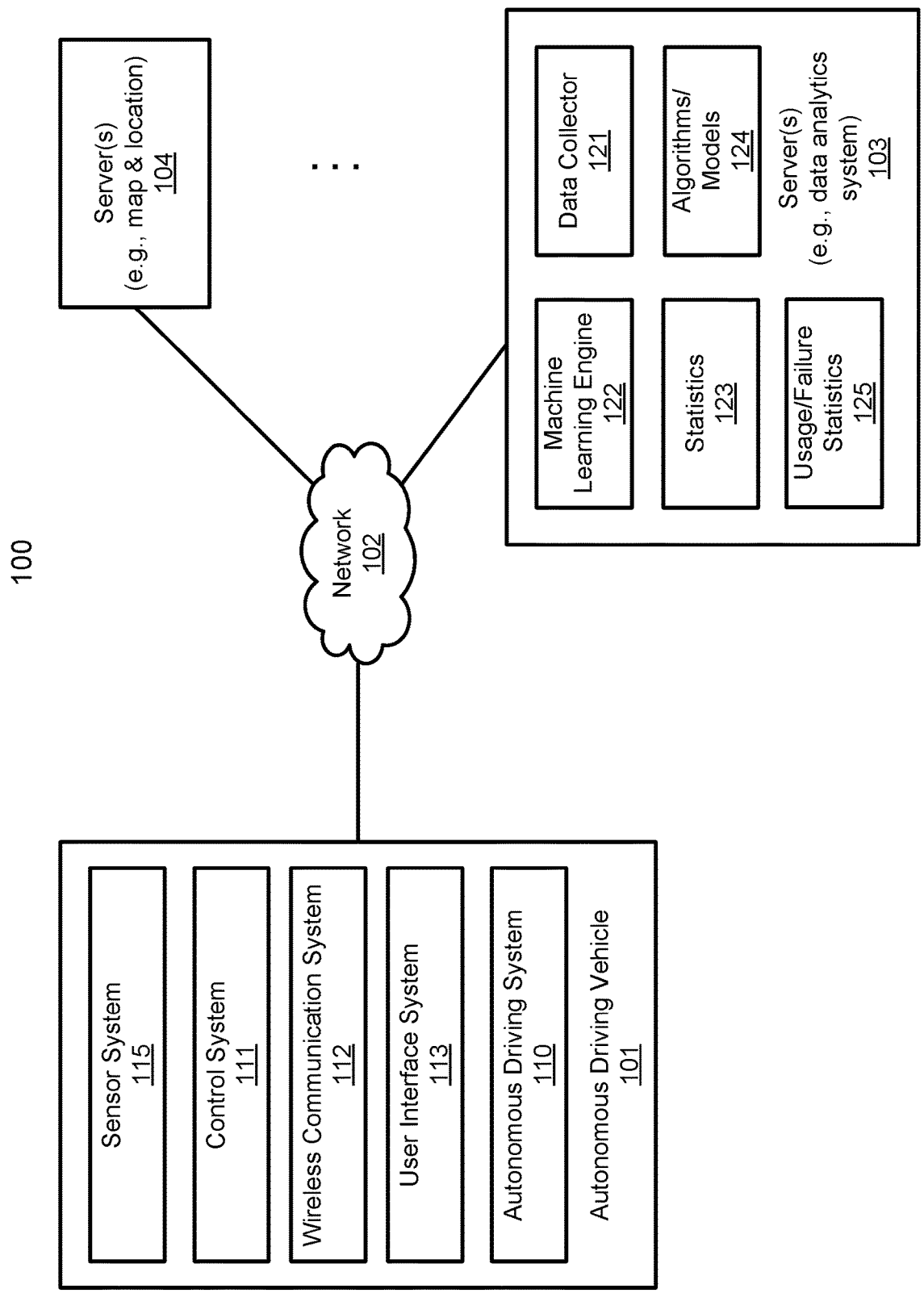
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

A controller area network (CAN) bus is a vehicle bus standard designed to allow microcontrollers and devices (e.g., electronic control units (ECUs)) communicate with one another without a host computer. CAN is based on a messaging protocol, designed to multiplex electrical wiring within an automobile. For each device, the data in a frame is transmitted serially and in a way that if more than one device transmits at the same time, the device with the highest priority can continue to transmit while the other devices fall back. The transmitted frames are received by all devices, including the transmitting device.

A vehicle can have one or more CAN buses. For example, CAN buses can be dedicated to certain vehicle domains, e.g., infotainment CANs, vehicle control CANs, chassis domain CANs. CAN buses can also be categorized for different speeds (e.g., high speed CAN, low speed CAN), etc. CAN buses can also be designed as redundant components for backup purposes.

With the development of drive-by-wire systems, CAN buses can be used for communications between the different drive-by-wire systems and an autonomous driving system of the vehicle. There is a need to perform failure fallback braking when the different drive-by-wire systems detect CAN buses malfunctions or a lost of communication of the CAN buses is detected.

Furthermore, when a brake is applied, a single deceleration request may not result in the best of neither brake performance robustness, driver comfortable, or braking speed. An adaptive braking scheme according to various driving scenario can balance the brake performance robustness, driver comfortable, and braking speed.

Moreover, when a redundant chassis domain controller (e.g., a redundant drive by wire system) is used for an ADS, the ADS will activate the redundant DBW system if the primary DBW system fails. However, since that the ADS defaults to use the primary DBW system, the life of the primary DBW system is shorten if the primary DBW is strenuously used. When the redundant DBW system is not activated for a prolong period of time, the redundant DBW may not function as intended. There is a need to alternate between the primary and the redundant DBW systems even when the primary DBW system is operational to ensure the redundant DBW operates as intended and to prolong the life of the primary DBW system.

According to some embodiments, a system performs a failure fallback brake mechanism when the system detects that the communication channels of a primary and a secondary controller area network (CAN) is malfunctioning.

According to a first aspect, a system determines a signal fault at a communication bus of an autonomous driving vehicle (ADV). In response to determining the signal fault, the system sends a brake pre-charge command to a brake system of the ADV to pre-charge a brake of the ADV. The system determines a preset tolerance time to validate the signal fault. In response to a time elapse of the preset tolerance time, the system validates the signal fault at the communication bus or determine a signal fault at another communication bus. In response to validating the signal fault at the communication bus or determining the signal fault at the other communication bus, the system sends a brake command to the brake system of the ADV to engage brakes for the ADV.

According to a second aspect, a system determines selection parameters to apply an adaptive braking scheme for an autonomous driving vehicle (ADV). The system determines a brake mode based on the selection parameters using a driving scenario mapping table. In response to determining that a brake is to be applied, the system applies a brake for the ADV according to the brake mode. The brake can be applied in three stages, where the three stages include a brake pre-charge stage, an increasing rate of deceleration stage, and a constant rate of deceleration stage.

According to a third aspect, a system determines activation parameters for an autonomous driving vehicle (ADV), where the activation parameters include historical usages of a primary brake system or a secondary brake system. In response to determining that a brake is to be applied, the system determines whether to activate a primary or a secondary brake system based on the activation parameters. The system sends an activation flag to activate the primary or the secondary brake system based on the determining whether to activate the primary or the secondary brake system. The system sends a brake command to the primary and the secondary brake system to activate either the primary or the secondary brake system according to the activation flag.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
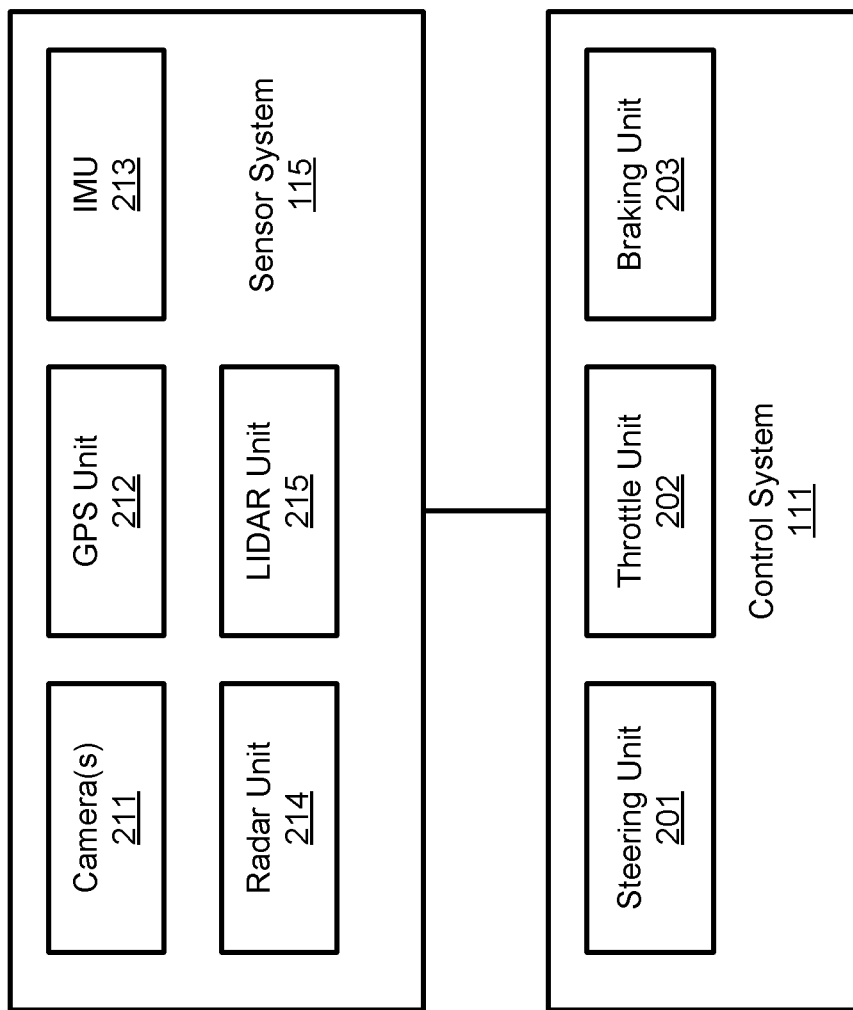
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Data collector 121 can collect usage/failure statistics 125 for ADV 101. Usage/failure statistics 125 may include usage information and/or failure information for the primary and/or secondary (redundant) systems of the ADV. For example, usage information can include how many times (and/or average of how many hours) either the primary or the second systems are used over a predetermined length of time. Failure information can include the warning indicators, which subsystems of the ADV indicates a failure/warning, corresponding levels of the failures, etc. The primary and/or secondary systems can be for the chassis domain controllers (drive-by-wire systems), computing systems (ADS) of the ADV, braking systems, steering systems, throttle systems, transmission systems, sensor systems, individually sensors, and/or power systems.

Based on driving statistics 123 and usage/failure statistics 125, machine learning engine 122 generates or trains a set of rules, algorithms, and/or predictive models 124 for a variety of purposes. In one embodiment, algorithms 124 may include a selection algorithm to select a brake mode to apply to ADV and an activation algorithm used to activate either primary system(s) or secondary (redundant) system(s) of the ADV.

Algorithms 124 can then be uploaded on ADVs to be utilized during autonomous driving in real-time.

Figure 3A:
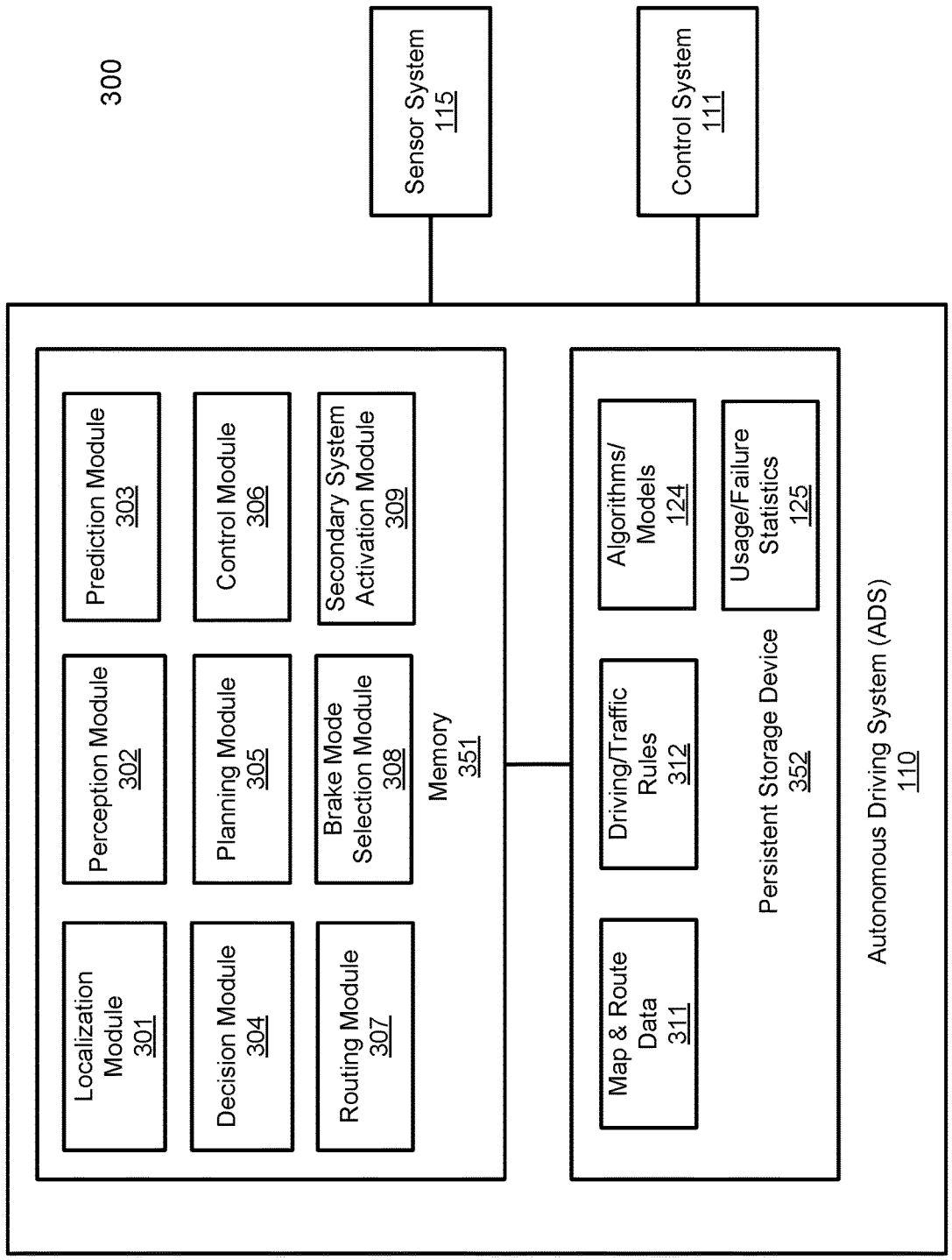
FIGS. 3A-3B are block diagrams illustrating an example of an autonomous driving system used with an autonomous driving vehicle according to one embodiment.
Figure 3B:
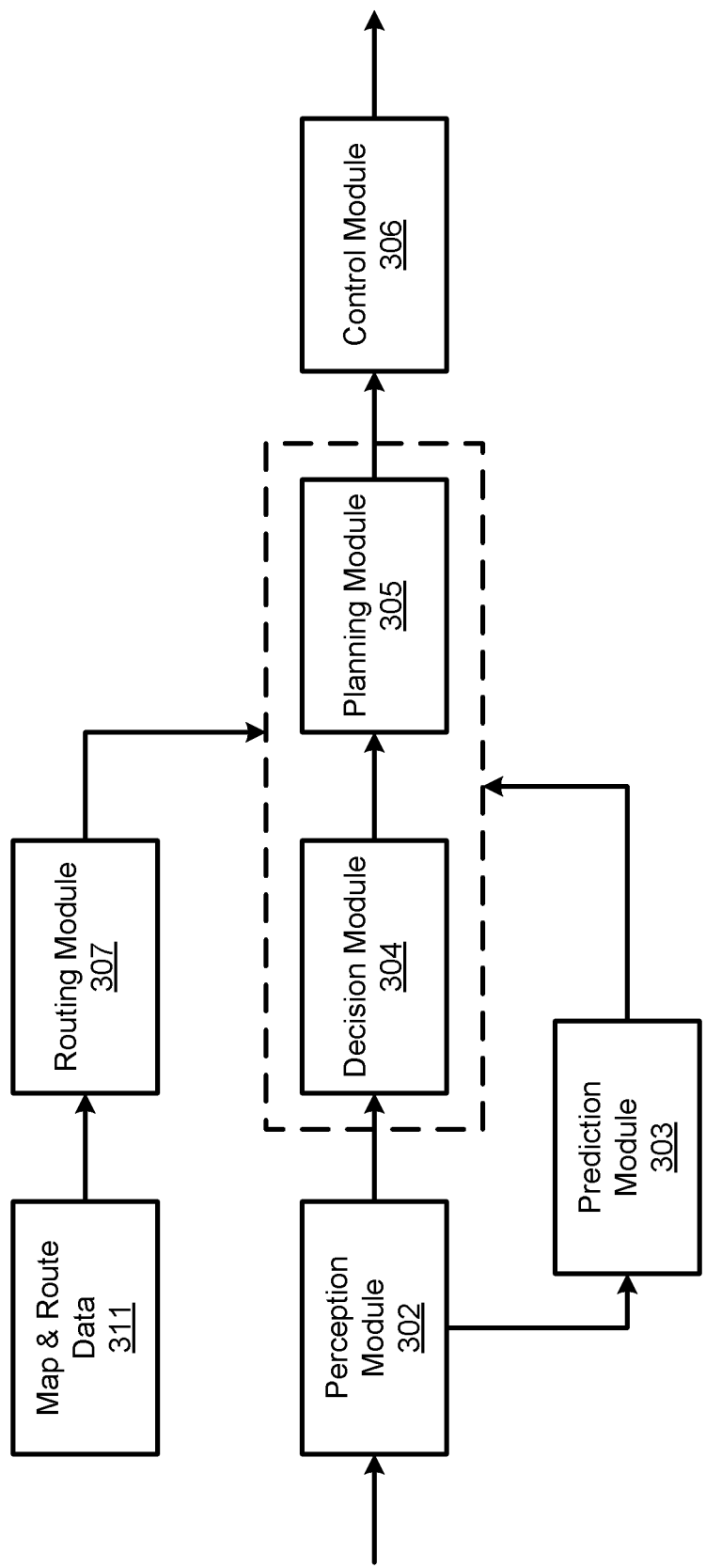

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, brake mode selection module 308, and secondary system activation module 309.

Some or all of modules 301-309 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-309 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 101 would move in a next moving cycle (e.g., next route/path segment). For example, the planning and control data may instruct vehicle 101 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 50 milliseconds (ms). For each of the planning cycles or driving cycles, one or more control commands will be issued based on the planning and control data. That is, for every 50 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Brake mode selection module 308 can determine statuses for the primary/secondary ADS, the primary/secondary chassis domain controllers, and driving statistics to select a brake mode from a mapping table. The brake mode selection of brake mode selection module 308 is further detailed in FIGS. 6-9.

Secondary system activation module 309 can gather usage/failure statistics of different primary and secondary systems of the ADV 101. Using the usage/failure statistics, and driving statistics, secondary system activation module 309 can activate either the different primary or the secondary systems of the ADV. By activating the secondary systems even when the primary systems are operational, the useful life of the primary systems can be extended and the likelihood of failure of the secondary systems can be mitigated. The activation by secondary system activation module 309 is further detailed in FIGS. 10-15. Note that brake mode selection module 308 and secondary system activation module 309 may be integrated as an integrated module.

Figure 4:
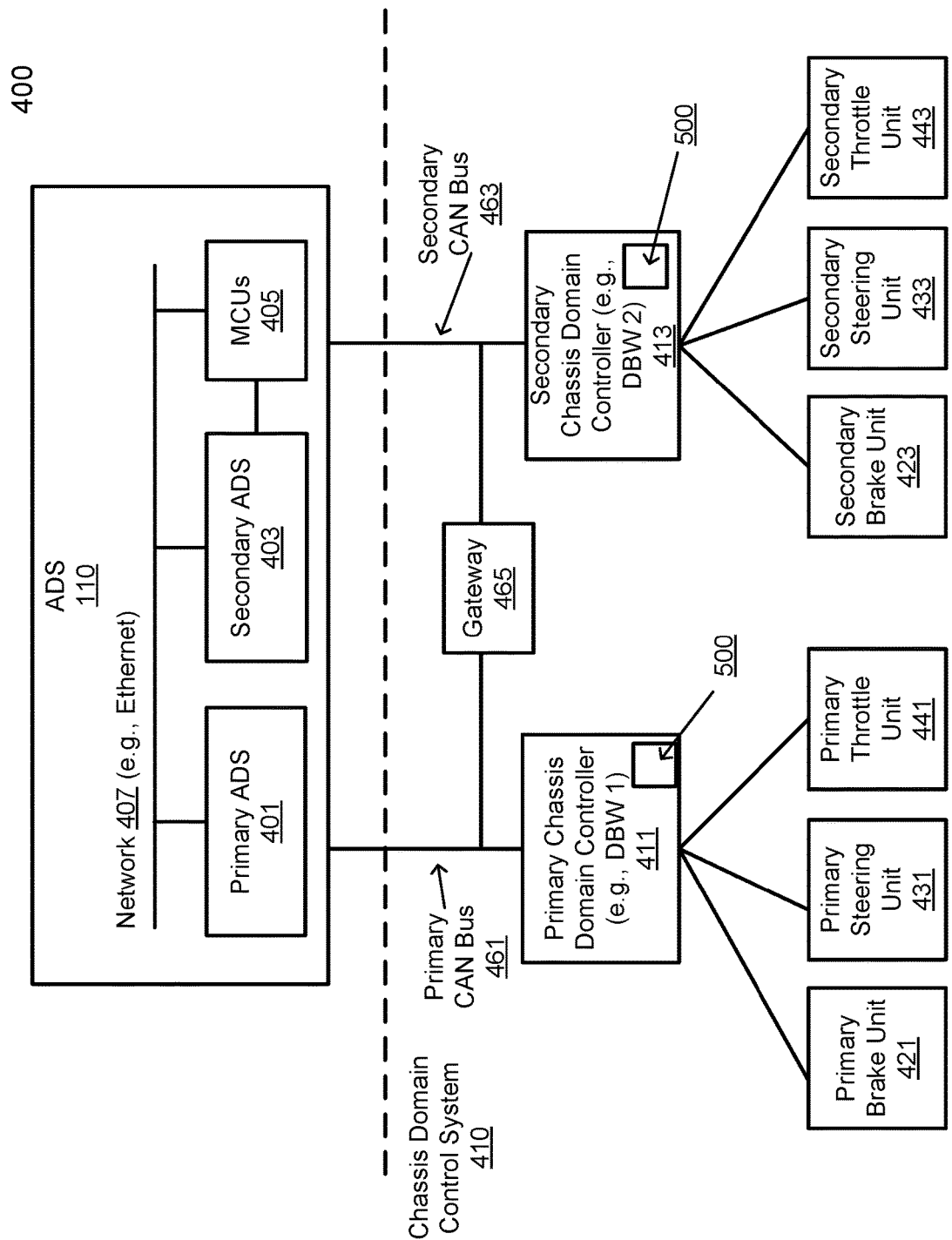
FIG. 4 is a block diagram illustrating an example of redundant systems for an autonomous driving vehicle according to one embodiment.

FIG. 4 is a block diagram 400 illustrating an example of redundant systems for an autonomous driving vehicle according to one embodiment. Typically, vehicle safety requires critical control systems to be designed with redundancy. For example, a vehicle autonomous driving system (ADS) can include primary and secondary ADS systems, where the secondary ADS operates in a redundancy mode.

Vehicle controls are divided into chassis, body, and powertrain domains. Powertrain domain relates to controls of engine and transmission of a vehicle. Body domain relates to controls of windows, doors, mirrors adjustment, seat adjustment, ventilation, heating etc. Chassis domain relates to controls of the brakes, throttle, and/or steering for vehicle stability and dynamics.

A chassis domain control system 410, as part of vehicle control system 111 of FIG. 1, can represent the controls for the chassis domain. Although body and powertrain domains are not shown in FIG. 4, the redundant systems can be extended to the body and powertrain domains.

Referring to FIG. 4, ADS 110 can include a primary ADS 401, and a secondary ADS 403. In one embodiment, primary ADS 401 serves as the default ADS system for ADV 101 and secondary ADS 403 acts as a redundant system and is activated when primary ADS 401 fails. In one embodiment, ADS 110 includes one or more microcontrollers (MCUs) 405. MCUs 405 can include a system on chip (SOC) with processor core(s), memory and input/output (I/O) in a one discrete package. MCU 405 can be used to communicate control signals for body control, driving control, infotainment and driving assistance control systems, etc. In one embodiment, MCU 405 can communicate with chassis domain control system 410. For example, MCU 405 can communicate brake commands to chassis domain control system 410 to activate the brakes.

Referring to FIG. 4, in one embodiment, chassis domain control system 410 includes primary and secondary chassis domain controllers 411-413, primary and secondary brake units 421-423, primary and secondary steering units 431-433, and primary and secondary throttle units 441-443.

Chassis domain controllers 411-413 are coupled to ADS 110 via primary and secondary CAN buses 461-463. Primary and secondary CAN buses 461-463 are coupled via gateway 465 so components on the primary CAN bus can communicate signals to components on the secondary CAN bus, and vice versa. In one embodiment, either of chassis domain controllers 411-413 can receive signals from ADS 110 and/or sensor system 115, and issue commands/signals to any of electronic control units (ECUs) (not shown) corresponding to units 421-443. The ECUs can then send the control commands to units 421-443 to control actuations of units 421-443.

With the development of automobile intelligence, the chassis of traditional vehicles are modified by wire to be suitable for automatic driving, e.g., drive-by-wire systems. Some examples of drive-by-wire systems include steering by wire, braking by wire, shift (transmission) by wire, oil control valve and suspension by wire, etc. Steering by wire and braking by wire are critical vehicle controls and are typically designed with redundancy.

In some embodiments, chassis domain controllers 411-413 include respective drive-by-wire (DBW) units 1-2. In some embodiments, brake, steering, and throttle units 421-443 include corresponding brake-by-wire, steering-by-wire, and/or throttle-by-wire systems. In some embodiments, brake, steering, and throttle units 421-443 include the conventional hydraulic brake system, a steering column for steering, and a direct mechanical linkage for throttle.

Referring to FIG. 4, when signal fault occurs at primary and/or secondary CAN buses 461-463, chassis domain controllers 411-413 may not be able to receive command signals from MCU 405. In one embodiment, primary chassis controller 411 and/or secondary chassis controller 413 includes signal fault brake module 500. C signal fault brake module 500 can activate the brakes when module 500 detects signal faults at primary and/or secondary CAN buses 461-463.

Figure 5:
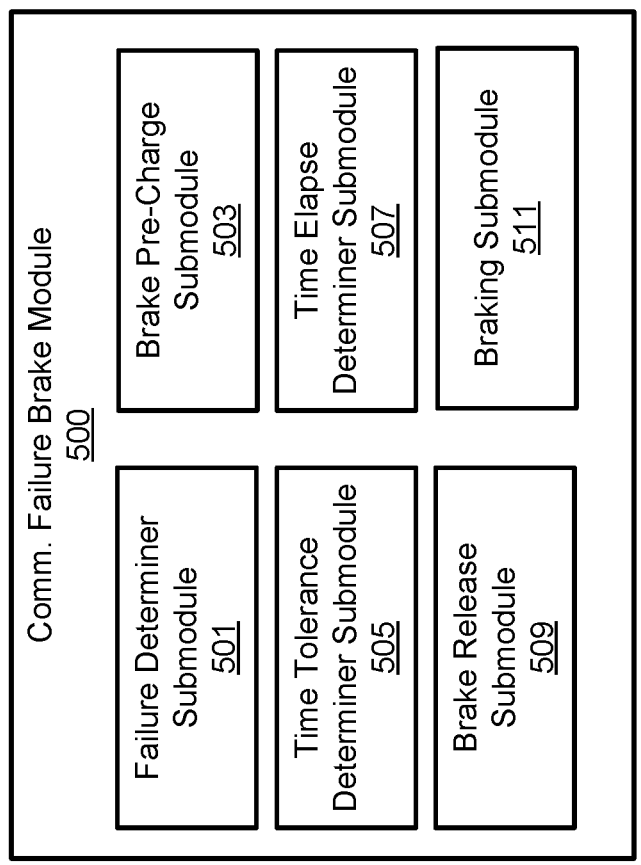
FIG. 5 is a block diagram illustrating an example of a signal fault brake module according to one embodiment.

FIG. 5 is a block diagram illustrating an example of a signal fault brake module 500 according to one embodiment. Signal fault brake module 500 can detect a communication bus (e.g., CAN bus) failure and issue a brake command to the brake units. The signal faults can include communication faulty cable, noise, incorrect termination, bus disconnect events, bus failure events, etc. Some failure modes can include CAN high signal line (CAN_H) interrupted, CAN low signal line (CAN_L) interrupted, CAN_H shorted to ground, CAN_L shorted to ground, CAN_H shorted to battery voltage, CAN_L shorted to battery voltage, CAN_H shorted to CAN_L, etc.

In one embodiment, signal fault brake module 500 includes failure determiner submodule 501, brake pre-charge submodule 503, time tolerance determiner submodule 505, time elapse determiner submodule 507, brake release submodule 509, and braking submodule 511. Failure determiner submodule 501 can determine a failure has occurred on a communication bus. For example, submodule 501 can detect a failure mode, error code or a communication disconnect for a primary CAN bus or a secondary CAN bus, such as primary CAN bus 461 or secondary CAN bus 463 of FIG. 4. Brake pre-charge submodule 503 can issue a brake pre-charge command to the brake unit. The brake pre-charge command can cause a brake pad to move within a threshold distance to the brake rotor (e.g., no contact or slight contact) but not cause ADV 101 to stop.

Time tolerance determiner submodule 505 can determine a time tolerance to valid a failure. The tolerance time can be preset by the ADS and can represent a time threshold to ascertained that a failure is not intermittent. That is, the failure is validated when the failure still exists over a period of the tolerance time. An example of a tolerance time can be 300 milliseconds. For this example, if an error had occurred at reference time=0 ms (milliseconds) and each cycle the error is detected thereafter, then the error is ascertained/ validated at time=300 ms. The failure validation can cause the ADS to perform error mitigation tasks. In another example, if an error had occurred at time=0 ms (milliseconds) and the error is mitigated at time=100 ms the failure is said to be invalidated at time=100 ms. If the failure reappeared at time=140 ms and lasts until time=440 ms, the failure is validated only at time=440 ms since a count of the tolerance time is restarted at time=140 ms and the failure lasted over the tolerance time of 300 ms.

Time elapse determiner submodule 507 can determine a time elapse since a failure has been detected for failure validation. Brake release submodule 509 can release the brakes if the failure is invalidated. Braking submodule 511 can apply the brakes if a failure is validated. Note that any of submodules 501-511 can be integrated as an integrated module and can be implemented in software or hardware.

Although a failure fallback brake mechanism can be used for a brake-by-wire system, the failure fallback brake mechanism can also be used for a hydraulic brake system.

Figure 6:
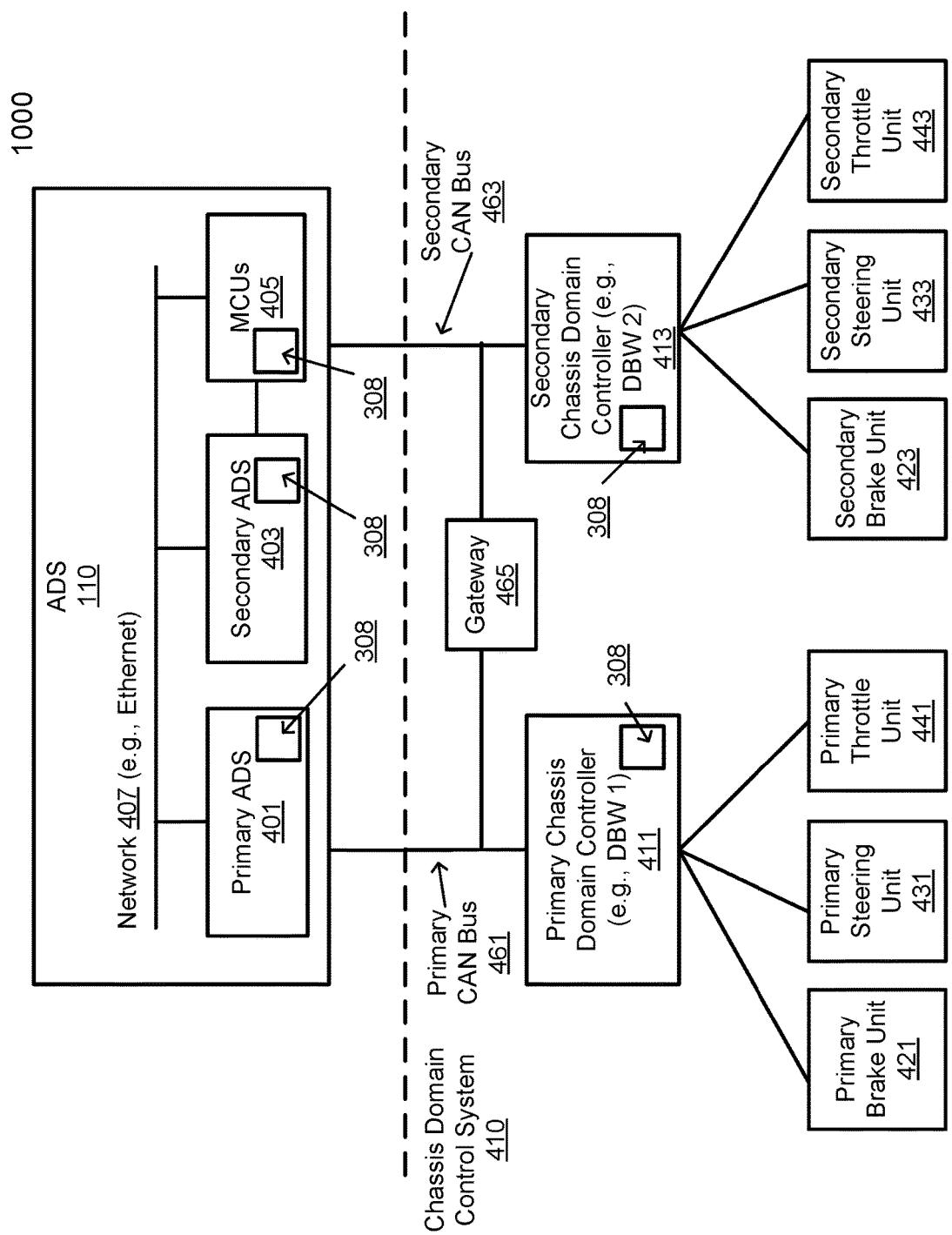
FIG. 6 is a block diagram illustrating an example of redundant systems for an autonomous driving vehicle according to one embodiment.

FIG. 6 is a block diagram illustrating an example of redundant systems for an autonomous driving vehicle according to one embodiment. System 1000 can represent system 400 of FIG. 4. In one embodiment, primary or secondary ADS 401-403 can include brake mode selection module 308. In one embodiment, primary or secondary chassis domain controllers 411-413 can include brake mode selection module 308. Description for various components of system 1000 can be referenced to system 400 of FIG. 4.

Figure 7:
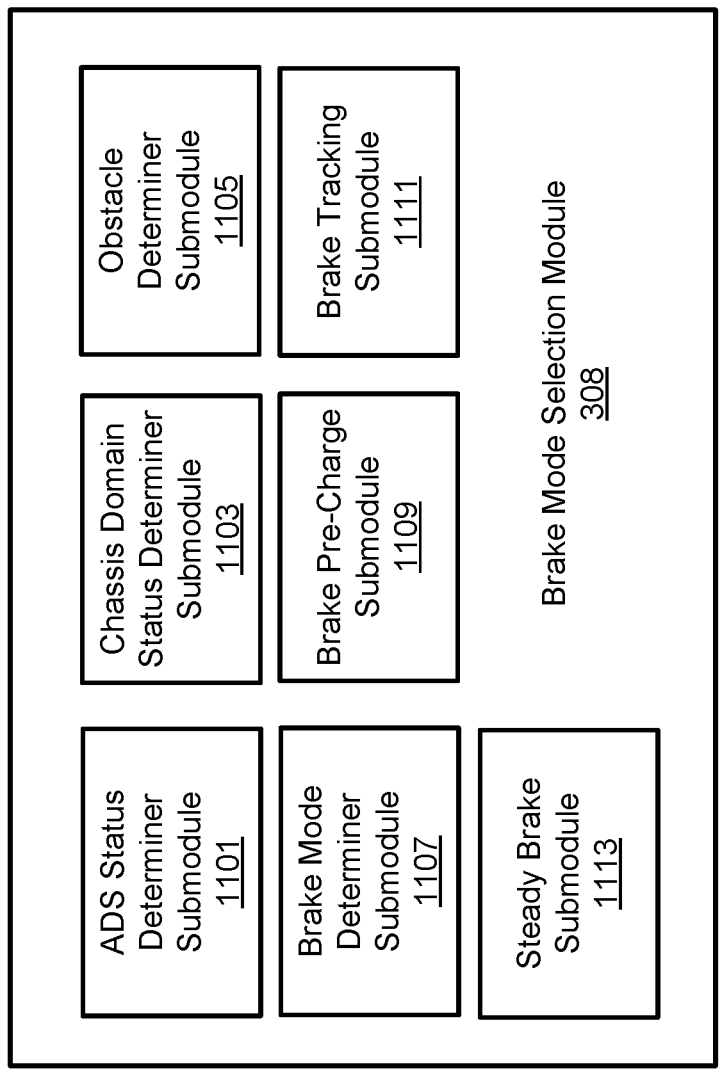
FIG. 7 is a block diagram illustrating an example of a brake mode selection module according to one embodiment.

FIG. 7 is a block diagram illustrating an example of a brake mode selection module 308 according to one embodiment. Brake mode selection module 308 can select a brake mode (e.g., sharp brake, gradual brake, or any other modes) from selection parameters available to ADV 101. In one embodiment, brake mode selection module 308 includes ADS status determiner submodule 1101, chassis domain status determiner submodule 1103, obstacle determiner submodule 1105, brake mode determiner submodule 1107, brake pre-charge submodule 1109, and brake tracking submodule 1111, steady brake submodule 1113.

Referring to FIGS. 6-7, ADS status determiner submodule 1101 can determine a status of primary or secondary ADS 401-403. Chassis domain status determiner submodule 1103 can determine a status of primary or secondary domain controller 411-413. The status can correspond to an associated failure level, such as F0-F4 shown in FIG. 8F. Obstacle determiner submodule 1105 can detect obstacles surrounding ADV 101. Obstacles surrounding ADV 101 can be detected using sensors (cameras, LIDAR, RADAR, time of flight (TOF) sensors) and the obstacles can be categorized to one of pedestrian, vehicles, etc., using an imaging recognition algorithm or a machine learning model. Brake mode determiner submodule 1107 can determine a brake mode using the ADS/chassis domain status, vehicle status (driving mode), and/or obstacle information. When ADV applies a brake, the brake can be a multi-stage brake as described in the above. Brake pre-charge submodule 1109 can apply a brake pre-charge command to reduce a pre-charge time for the brakes. Brake tracking submodule 1111 can apply a brake command to limit the dA_req/dt to be within a threshold, thus, improving operator comfort. Steady brake submodule 1113 can issue a A_req command.

FIG. 8F illustrates a legend for the failure levels F0-F4 in mapping table 1300 of FIGS. 8A-8E. For example, the failure level F0 corresponds to no failure or failure free operation. F1 corresponds to a failure for the corresponding system but the failure level does not affect the ADS operations. F2 corresponds to a failure that affects the ADS and is severe enough to require the ADV to slow down. F3 corresponds to a failure that affects the ADS and is severe enough to require the ADS to eventually stop the ADV. F4 corresponds to a failure that affects the ADS and requires to stop the ADV immediately.

In one embodiment, as shown in mapping table 1300 of FIGS. 8A-8E, each of the ADS and the chassis domain controllers (CDC) of the ADV has a redundant counterpart. The primary ADS, secondary ADS, primary CDC, and secondary CDC can correspond to systems/components 401, 403, 411, and 413 of FIG. 6 respectively. In one embodiment, as shown in mapping table 1300, an ADS can issue the brake commands for scenarios 1-48. An MCU or CDC can issue the brake commands for scenario 49-50, and a CDC (e.g., CDC 1 or 2) can issue the brake controls for scenario 51. Although the ADS and the chassis domain controller are shown with redundancy, An ADV can be configured without the redundancy, and processing logic can generate a corresponding mapping table with reduced scenarios corresponding to mapping table 1300. In some embodiments, mapping table 1300 is configured by an operator and uploaded onto ADV 101 at persistent storage devices accessible by ADS 401, ADS 403, primary CDC 411, secondary CDC 413, and MCU 405.

Referring to scenario 51 in FIG. 8E, the primary or secondary CDC (e.g., DBWs 1, 2) exhibits failure levels F3/F4 (e.g., ADS function of the corresponding components is affected) and the primary/secondary ADS exhibit any of failure levels F0-F4. In this scenario, since the primary or secondary CDCs are at failure levels F3/F4 (e.g., ADS function of the corresponding components is affected), a CDC (any of primary or secondary CDC) is mapped in mapping table 1300 to issue a brake control corresponding to sharp braking. In this case, the failure is critical and sharp braking mode is selected and a CDC would issue the sharp braking commands, regardless of the other selection parameters.

Referring to scenario 50 in FIG. 8E, primary ADS, secondary ADS, and primary CDC exhibit F3/F4 failure levels (e.g., ADS function of the corresponding components is affected), while secondary CDC only exhibits F0/F1/F2 failure levels (e.g., ADS function of the corresponding components is not affected). In this case, the failure at both the primary and secondary ADSs affects ADS functions and sharp braking mode is selected. Furthermore, at least the secondary CDC can receive a brake command and control the brakes using the received brake commands. Thus, regardless of any vehicle at front, pedestrian at front, or vehicle behind ADV, sharp braking can be issued by the MCU or the CDC.

Referring to scenario 49 in FIG. 8E, primary ADS and secondary ADS exhibit F3/F4 failure levels (e.g., ADS function of the corresponding components is affected), primary CDC exhibits F0/F1/F2 (e.g., ADS function of the corresponding components is not affected), and secondary CDC exhibits F0/F1/F2/F3/F4 failure levels (e.g., can be any of F0 to F4). In this case, the failure is critical at the primary and secondary ADSs and sharp braking mode is selected. Furthermore, at least the secondary CDC is operational to receive a brake command and control the brakes from the received brake commands. Thus, the brake controls corresponding to sharp braking mode can be issued by the MCU or a CDC.

Referring to scenarios 1-48 in FIGS. 8A-8D, at least one of primary or secondary ADS has ADS operations functioning (e.g., F0/F1/F2) and at least one of primary or secondary CDC has ADS operations functioning (e.g., F0/F1/F2), the brake mode selection would then correspond to: whether any vehicle at front (and a distance threshold), pedestrian at front (and a distance threshold), and/or vehicle following behind the ADV.

For example, in scenario 5, primary ADS has failure level F3-F4 indicating corresponding AD operations are affected; secondary ADS has failure level F0-F2 indicating corresponding AD operations are not affected; primary CDC has failure level F0-F2 indicating corresponding AD operations are not affected. Here, regardless of the status of secondary CDC, a brake signal can be propagated at least by secondary ADS to primary CDC. In this case, ADV detects that a vehicle ahead and is braking sharply, a pedestrian close by (e.g., within a predetermined distance) in front of the ADV, and a vehicle is close by (e.g., within a predetermined distance) following the ADV. According to mapping table 1300, ADV selects the sharp braking mode (because there is a vehicle ahead and is braking sharply). E.g., primary ADS would issue the three-stage brake command for sharp braking.

Figure 9:
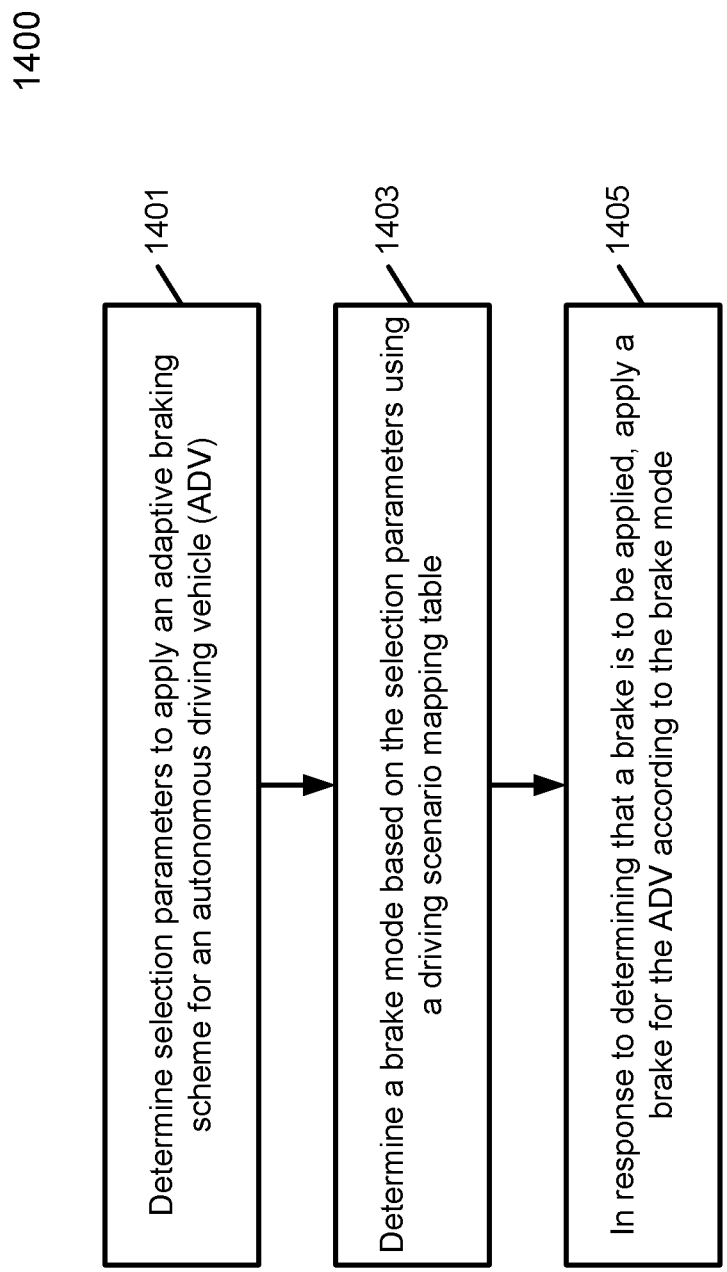
FIG. 9 is a flow diagram illustrating a method to select a brake mode according to one embodiment.

FIG. 9 is a flow diagram illustrating a method to select a brake mode according to one embodiment. Process 1400 may be performed by processing logic which may include software, hardware, or a combination thereof. For example, process 1400 may be performed by primary ADS 401, secondary ADS 403, primary CDC 411, or second CDC 413 of FIG. 6.

At block 1401, processing logic determines selection parameters to apply an adaptive braking scheme for an autonomous driving vehicle (ADV).

At block 1403, processing logic determines a brake mode based on the selection parameters using a driving scenario mapping table.

At block 1405, in response to determining that a brake is to be applied, processing logic applies a brake for the ADV according to the brake mode.

In one embodiment, the brake mode includes a gradual brake mode or a sharp brake mode.

In one embodiment, the selection parameters include a driving direction, presence of a vehicle at front of the ADV, distance to the vehicle at the front of the ADV, presence of a pedestrian at front of the ADV, distance to pedestrian, presence of a vehicle behind the ADV, or distance to the vehicle behind the ADV.

In one embodiment, the selection parameters include a status of an autonomous driving system (ADS) of the ADV.

In one embodiment, the selection parameters include a status of chassis domain controller of the ADV.

In one embodiment, the brake mode corresponds to brake commands applied in three stages, wherein the three stages include a brake pre-charge stage, an increasing rate of deceleration stage, and a constant rate of deceleration stage.

In one embodiment, the sharp brake mode corresponds to a pre-charge command corresponding to a first predetermined duration, an increasing rate of deceleration command corresponding to a first preset increasing rate of deceleration, or a first preset constant rate of deceleration command corresponding to the first preset constant rate of deceleration.

In one embodiment, the gradual brake mode corresponds to a pre-charge command corresponding to the first predetermined duration, an increasing rate of deceleration command corresponding to a second preset increasing rate of deceleration, or a constant rate of deceleration command corresponding to the first preset constant rate of deceleration, wherein the first preset increasing rate of deceleration is great than the second preset increasing rate of deceleration.

In one embodiment, determining that a brake is to be applied includes determining the ADV has reached its destination, reached a traffic stop, or a vehicle in front of the ADV applied a brake.

In one embodiment, the autonomous driving system (ADS) of the ADV includes a primary ADS or a secondary ADS, wherein the secondary ADS is a redundant ADS.

Figure 10:
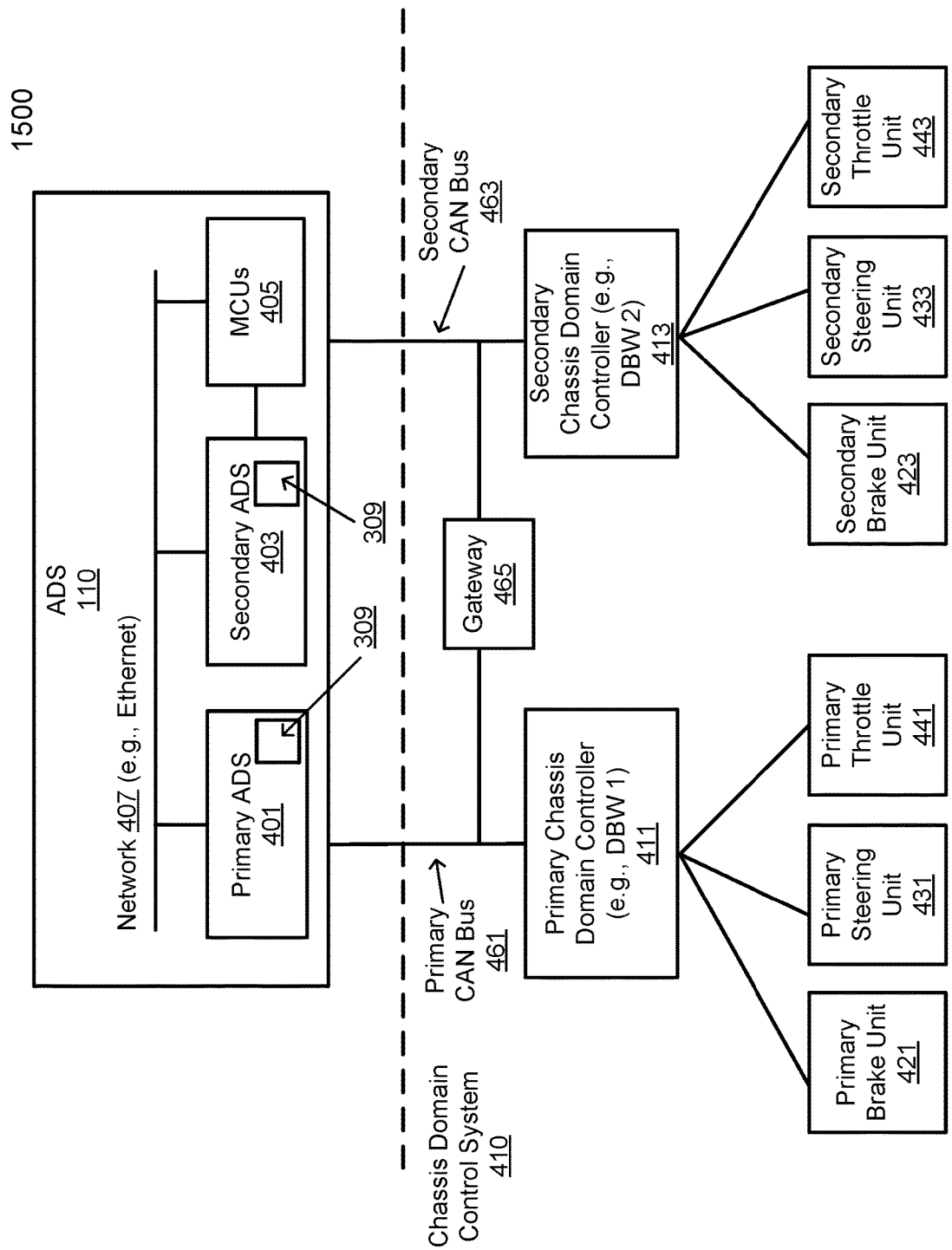
FIG. 10 is a block diagram illustrating an example of redundant systems for an autonomous driving vehicle according to one embodiment.

FIG. 10 is a block diagram illustrating an example of redundant systems for an autonomous driving vehicle according to one embodiment. System 1500 can represent system 400 of FIG. 4. In one embodiment, primary ADS 401 or secondary ADS 403 can include secondary system activation module 309. Description for various components of system 1500 can be referenced to system 400 of FIG. 4.

Figure 11:
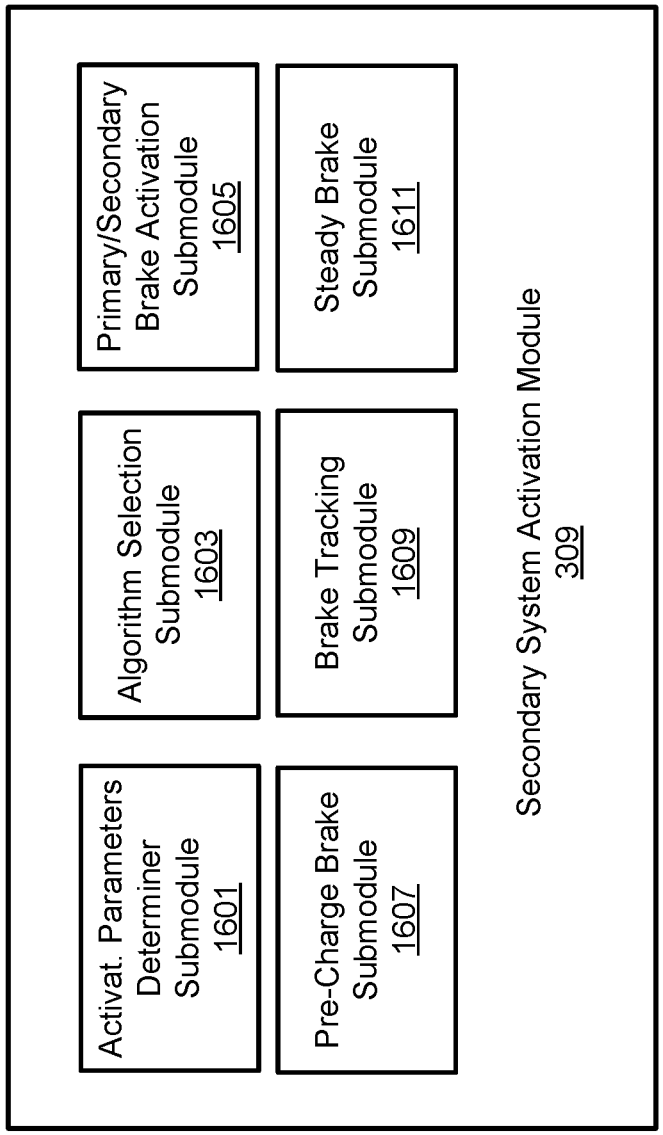
FIG. 11 is a block diagram illustrating a secondary system activation module according to one embodiment.

FIG. 11 is a block diagram illustrating a secondary system activation module 309 according to one embodiment. Secondary system activation module 309 can activate secondary system(s) (e.g., the primary systems/components can be activated by default) for various redundant systems/components of ADV 101. In one embodiment, secondary system activation module 309 includes activation parameters determiner submodule 1601, algorithms selection submodule 1603, primary/secondary brake activation submodule 1605, brake pre-charge submodule 1607, and brake tracking submodule 1609, steady brake submodule 1611.

Referring to FIGS. 10-11, activation parameters determiner submodule 1601 can determine one or more activation parameters for secondary systems/components activation. The activation parameters can include historical usages and failure data of the primary/secondary systems/components, safety factors, vehicle status, etc. Algorithms selection submodule 1603 can select an algorithm to determine whether to activate the secondary systems/components. Primary/secondary brake activation submodule 1605 can activate the primary and/or secondary systems/components according to an output of a selected algorithm. Brake pre-charge submodule 1607 can request a brake command to pre-charge the brakes to decrease a brake response time. Brake tracking submodule 1609 can request a brake command that limits a rate of deceleration of the ADV during a tracking response period, e.g., $-25$ m/s$^3$. Steady brake submodule 1611 can request a steady deceleration brake command, e.g., $=0.6$ g m/s$^2$.

Figure 12:
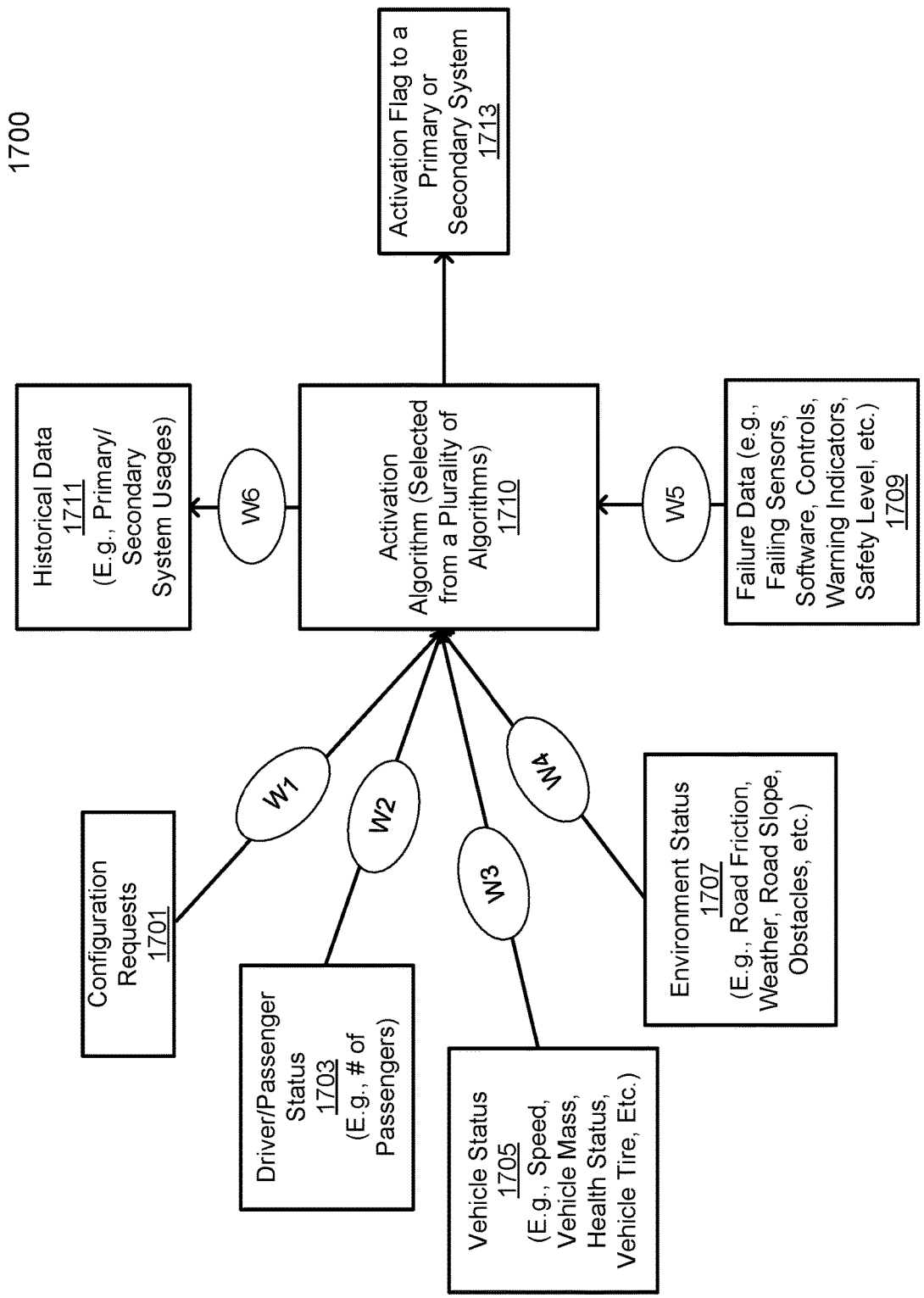
FIG. 12 is a block diagram illustrating an example of a secondary system activation process according to one embodiment.

FIG. 12 is a block diagram illustrating an example of an evaluation process 1700 to activate primary or secondary system/components according to one embodiment. Evaluation process 1700 can be performed by secondary system activation module 309 of FIG. 11 to select a primary system or a secondary system (e.g., secondary ADS, secondary CDC, secondary brake unit, etc.). As shown, ADV can obtain configuration requests 1701 as the activation parameters. Configuration requests 1701 can correspond to requests to activate the primary or the secondary systems/components. For example, an operator can input into a user interface of the ADV a request to activate either the primary or the secondary systems/components. The requests can be performed in real-time when the ADV is operating in a drive mode or when the ADV is idle in a parking/neutral transmission mode. In one embodiment, the requests can reflect a request for the next time the ADV is operated (e.g., after a system reboot).

In one embodiment, the ADV can obtain driver/passenger status 1703 as the activation parameters. Example of the driver/passenger status 1703 can be a number of passengers onboard the ADV and whether there is an operator. In one embodiment, the ADV can obtain vehicle status 1705 as the activation parameters. Vehicle status can include a current speed of the vehicle, vehicle mass, health indicators (e.g., whether there are dashboard warning lights), and/or traction of the vehicle tire. In one embodiment, the ADV can obtain environmental status 1707 as the activation parameters. Environmental status 1707 can include current road friction, current weather conditions (raining, sunny, or snowing conditions, etc.), current slope steepness of the road, how many and/or types of obstacles are detected by imaging sensors of the ADV.

In one embodiment, the ADV can obtain failure data 1709 as the activation parameters. Failure data 1709 can indicate which systems are failing or a duration and error level associated with a previous failure. For example, the failing data can include dashboard warning indicators, sensor errors, software errors with the control/planning systems of the ADS, CAN bus error codes, CDC error codes, and/or failure/safety level codes as shown in the example scenarios 1-51 of FIGS. 8A-8E, e.g., failure level F0/F1/F2/F3/F4. In one embodiment, ADV can obtain historical data 1711 as the activation parameters. Historical data 1711 can include historical usage statistics of the different primary and secondary systems/components. The historical usage statistics can be a collection of the operating durations (e.g., time with powered on) of the respective systems/components.

In one embodiment, ADV can select an activation algorithm from a plurality of algorithms to process the inputs 1701-1711. In an embodiment, the activation algorithm can be a weighted sum, where each category of inputs is multiplied by a respective weighting factor, e.g., W1-W6 and the sum of the outputs are compared with a predetermined threshold. If the weighted sum is greater than the predetermined threshold, a secondary system is activated. Else, the primary system is activated. In one embodiment, each input in a category of inputs have a different weighting factor. In one embodiment, the activation can be performed by the primary or secondary ADS in real-time, e.g., the primary system is switched over to the secondary system, or vice versa, when ADV is in a driving mode. In another embodiment, the activation occurs when ADV evaluates that it is safe to do so, e.g., when ADV detects that the ADV in a parking/neural transmission mode.

In one embodiment, process 1700 can be applied for each pair of primary and secondary subsystems/components to determine which of the primary/secondary subsystems/components would be activated. Each evaluation can be configured with a particular subset of inputs 1701-1711 relevant to the subsystem/component. The relevant subset of inputs can be preconfigured for each set of primary/secondary system/component. For example, to evaluate which of the primary/secondary brake units to activate, the inputs 1701-1711 can include: configuration requests from operator regarding a selection for the primary or secondary CDC, failure data regarding the primary/second brake units, warning indicators regarding brake fluids and/or brake pad conditions, how many passengers are onboard the ADV (e.g., detected by seatbelt detectors), vehicle weight status, condition of the road (rural, city, or highway), weather (raining, snowing, or sunny), and/or obstacles (vehicle in front, vehicle following behind, pedestrian crossing), etc. These inputs can be processed by a activation algorithm to activate the primary or the secondary brake unit.

In one embodiment, activation flag 1713 is sent to the CAN bus and are directed to a primary or a secondary system to activate the respective system. The activation flag can be represented by one or more bits that maps to a number of systems/sub-systems for activation. Each bit can be '0' or '1', where '0' represents activate and '1' represents deactivate, or vice versa.

In some embodiments, the plurality of activation algorithms can include an alternating algorithm. The alternating algorithm can alternatingly operate the primary or the secondary system at the start of the ADS of ADV. E.g., when the ADV engine is started/ADS system boots up. In one embodiment, the plurality of activation algorithms can include an algorithm to activate the primary subsystem or the secondary subsystem so each of the systems are operating, on average, a same number of operating hours.

In one embodiment, the plurality of activation algorithms can include an algorithm to activate the secondary subsystems for a minimum number of counts within a predetermined time period (e.g., a year).

Figure 13A:
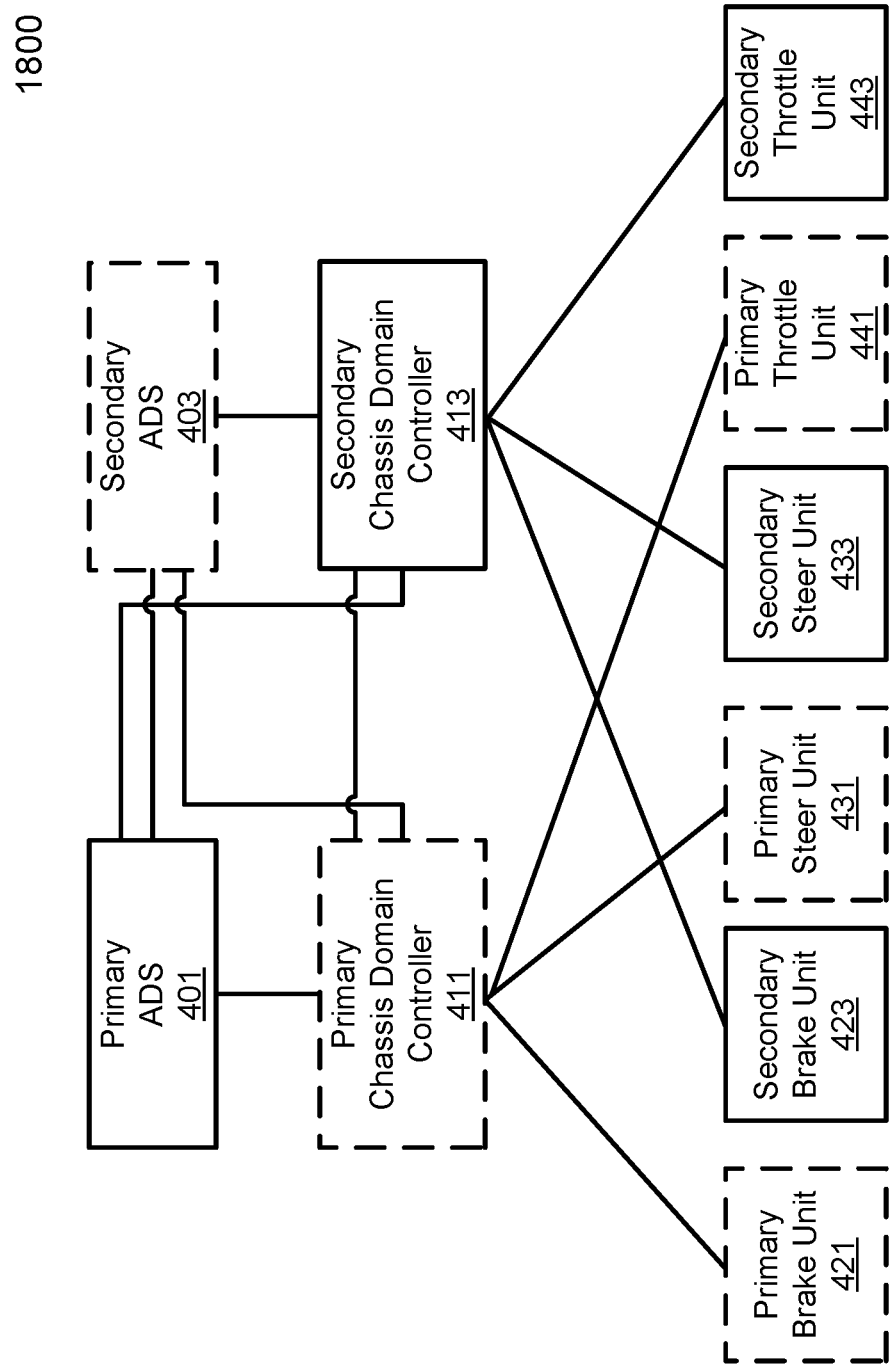
FIG. 13A is a block diagram illustrating an example of an activation configuration according to one embodiment.
Figure 13B:
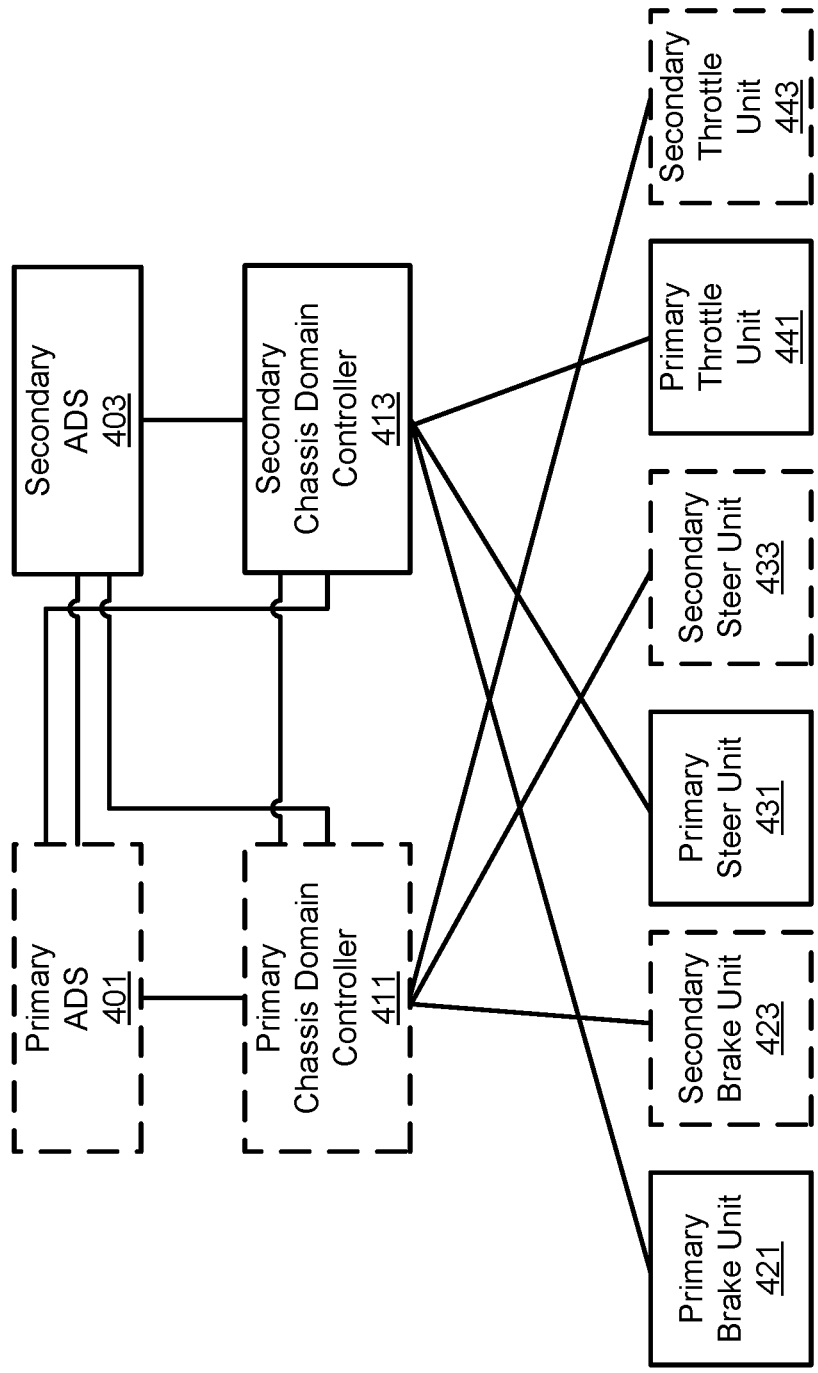
FIG. 13B is a block diagram illustrating an example of another activation configuration according to one embodiment.

FIGS. 13A-13B are block diagrams illustrating examples of activation configurations 1800-1810 according to some embodiments. For configurations 1800-1810, solid lines denote activated subsystems/components while dashed lines denote non-activated subsystems/components. In some embodiments, the non-activated systems are operational but their output signals are not routed to the next components for processing. In some embodiments, the non-activated systems are powered down. Referring to FIG. 13A, configuration 1800 includes activated primary ADS 401 to send command/signals to activated secondary CDC 413. The secondary CDC 413 processes commands/signals and submits signals to the activated secondary units, e.g., brake unit 423, steer unit 433, throttle unit 443 to control ADV 101.

Referring to FIG. 13B, in another embodiment, configuration 1800 includes activated secondary ADS 401 operating to send commands/signals to activated secondary CDC 413. The secondary CDC 413 processes the commands/signals and submits signals to the activated primary units, e.g., brake unit 421, steer unit 431, throttle unit 441 to control ADV 101. Although two configurations are shown in FIGS. 13A-13B for illustration purposes, other combinations of primary/secondary activation configurations are possible.

Figure 14:
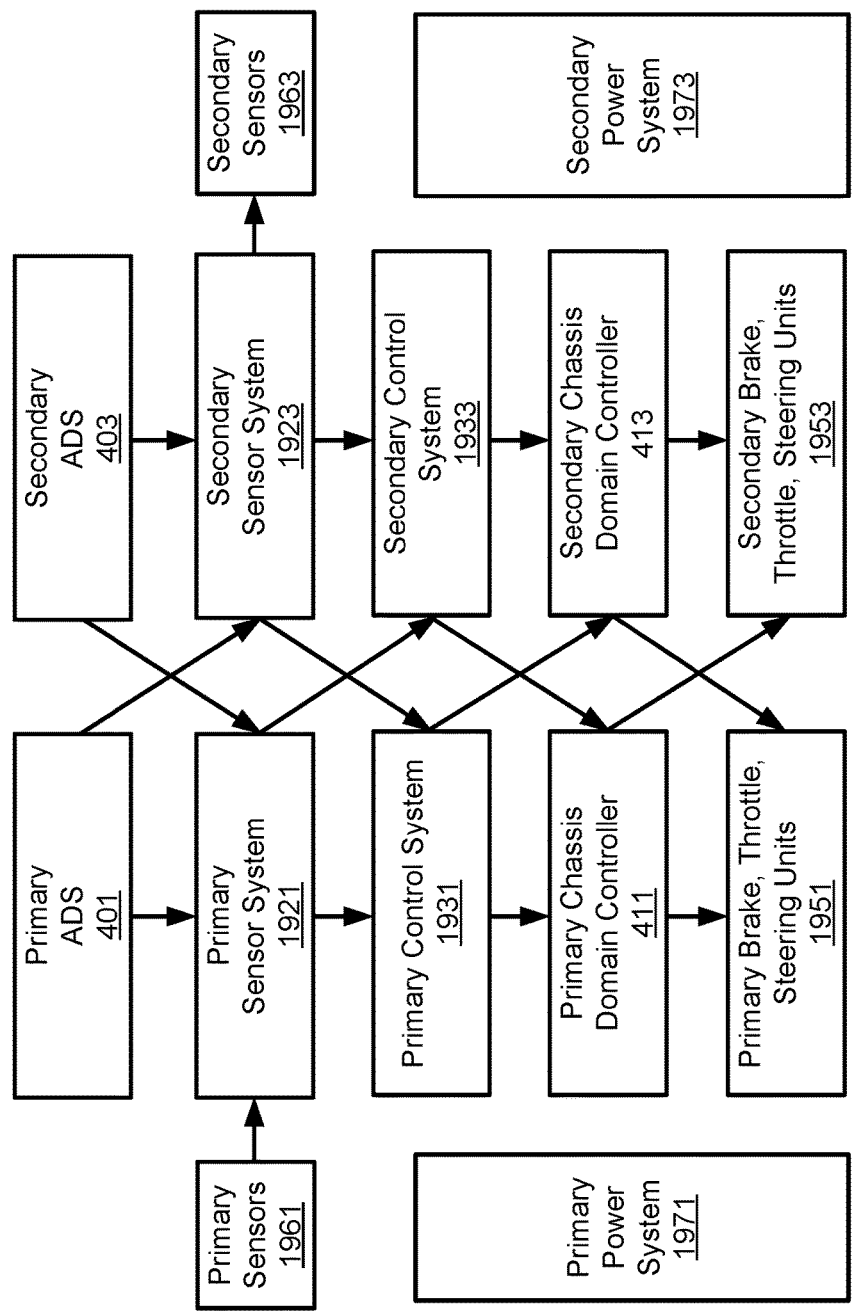
FIG. 14 is a block diagram illustrating different activation paths for various subsystems of the autonomous driving vehicle according to one embodiment.

FIG. 14 is a block diagram illustrating examples of different activation paths for various subsystems/components of the autonomous driving vehicle according to one embodiment. Referring FIG. 14, system 1900 can represent ADV 101 of FIG. 1. ADV 101 can include various subsystems/components. For example, system 1900 can include primary/secondary ADS systems 401-403, primary/secondary sensor systems 1921/1923, primary/secondary control systems 1931-1933, primary/secondary CDCs 411-413, primary/secondary braking, steering, and throttle units 1951-1953, primary/secondary sensors 1961-1963, and primary/secondary power systems 1971-1973. Note that primary/secondary sensor systems 1921/1923 can represent sensor system 115 of FIG. 3A, primary/secondary control systems 1931-1933 can represent control system 111 of FIG. 3A, primary/secondary sensors 1961-1963 can represent sensors 211-215 of FIG. 2, and primary/secondary power systems 1971-1973 can represent separate power supplies that powers the corresponding primary/secondary systems. Note that the braking, steering, and throttle systems 1951-1953 can represent units 421-443 of FIG. 10. In some embodiments, units 421-443 can include braking-by-wire, steering-by-wire, and/or throttle-by-wire systems.

As depicted in FIG. 14, each of the primary/secondary systems/components can be evaluated for activation using an activation algorithm, such as by process 1700 of FIG. 12. Here, the arrows of the primary/secondary systems denote the different possible paths/combinations for different activation configurations. An example activated configuration (e.g., configuration path) can be primary ADS 401, primary sensor system 1921 with primary sensors 1961, primary control system 1931, primary CDC 411, and primary braking, steering, and throttle units 1951, and primary power system 1971. Another example activated configuration (e.g., configuration path) can be secondary ADS 403, secondary sensor system 1923 with secondary sensors 1963, secondary control system 1933, secondary CDC 413, and secondary braking, steering, and throttle units 1953, and secondary power system 1973. Another example activated configuration (e.g., configuration path) can be primary ADS 401, secondary sensor system 1923 with secondary sensors 1963, secondary control system 1933, secondary CDC 413, and secondary braking, steering, and throttle units 1953, and secondary power system 1973. From the five primary/secondary systems/components, the number of different configurations can be 2^5=32. Although not shown, other subsystems and/or secondary domain controllers (e.g., powertrain domain, body domain, entertainment domain, etc.)/systems can be similarly processed for activation.

FIG. 15 is a flow diagram illustrating a method to activate a primary or a second system according to one embodiment. Process 2000 may be performed by processing logic which may include software, hardware, or a combination thereof. For example, process 2000 may be performed by primary ADS 401 or secondary ADS 403 of FIG. 10.

At block 2001, processing logic determines activation parameters for an autonomous driving vehicle (ADV), wherein the activation parameters include historical usages of a primary brake system or a secondary brake system.

At block 2003, in response to determining that a brake is to be applied, processing logic determines whether to activate a primary or a secondary brake system based on the activation parameters.

The determination can be performed in real-time when the ADV is in a driving mode or when the ADV is in a parking/neutral transmission mode. For example, the ADV can process the activation parameters with an activation algorithm to determine which system to activate.

At block 2005, processing logic sends an activation flag to activate the primary or the secondary brake system based on the determining whether to activate the primary or the secondary brake system.

For example, the activation flag can be sent to the CAN bus as an instruction to activate either the primary or the secondary brake system. The activation flag can include one or more bits in a bit map, each bit mapping to a primary/secondary sub-system for the activation.

At block 2007, processing logic sends a brake command to the primary and the secondary brake system to activate either the primary or the secondary brake system according to the activation flag. Here, at a command cycle, only one brake system (primary or secondary brake system) is active and can thus be triggered.

In one embodiment, the activation parameters include a plurality of safety factors including a count of passengers in the ADV, a safety status of an environment surrounding the ADV, or a vehicular status of the ADV.

In one embodiment, a safety status of the environment surrounding the ADV includes a traction of a road of the ADV, weather, or a slope of the road.

In one embodiment, the vehicle status of the ADV includes a current speed, a weight of the ADV, a health status of an autonomous driving system (ADS) of the ADV, or a health status of the primary or secondary brake system, or a tire traction of the ADV.

In one embodiment, the activation parameters further comprise a failure rate of an autonomous driving system (ADS) of the ADV.

In one embodiment, the activation parameters are inserted into a gain matrix to obtain a weighted sum value and whether to activate the primary or the secondary brake system is based on the weighted sum value.

In one embodiment, the secondary brake system is activated if the weighted sum value is greater than a predetermined threshold and the primary brake system is activated if the weighted sum value is less than or equal to the predetermined threshold.

In one embodiment, activating the primary or secondary brake systems includes activating the primary or secondary chassis domain controller to issue the commands to either the primary or secondary brake system.

In one embodiment, activating the primary or secondary brake system includes activating the primary or secondary by-wire systems.

In one embodiment, the primary or secondary by-wire systems include a primary or a secondary steer by-wire system, a primary or a secondary throttle by-wire system, or a primary or a secondary transmission-by-wire system.

In one embodiment, the primary or secondary brake system includes a primary or a secondary brake by-wire system.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method, comprising:
   determining activation parameters for an autonomous driving vehicle (ADV), wherein the activation parameters include historical usages of a primary brake system or a secondary brake system;
   in response to determining that a brake is to be applied, determining whether to activate a primary or a secondary brake system based on the activation parameters;
   sending an activation flag to activate the primary or the secondary brake system based on the determining whether to activate the primary or the secondary brake system; and
   sending a brake command to the primary and the secondary brake system to activate either the primary or the secondary brake system according to the activation flag.

2. The method of claim 1, wherein the activation parameters include a plurality of external safety factors including a count of passengers in the ADV, a safety status of an environment surrounding the ADV, or a vehicular status of the ADV.

3. The method of claim 2, wherein a safety status of the environment surrounding the ADV includes a traction of a road of the ADV, weather, or a slope of the road.

4. The method of claim 2, wherein the vehicle status of the ADV includes a current speed, a weight of the ADV, a health status of an autonomous driving system (ADS) of the ADV, or a health status of the primary or secondary brake system, or a tire traction of the ADV.

5. The method of claim 1, wherein the activation parameters further comprise a failure rate of an autonomous driving system (ADS) of the ADV.

6. The method of claim 1, wherein the activation parameters are inserted into a gain matrix to obtain a weighted sum value and whether to activate the primary or the secondary brake system is based on the weighted sum value.

7. The method of claim 6, wherein the secondary brake system is activated if the weighted sum value is greater than a predetermined threshold and the primary brake system is activated if the weighted sum value is less than or equal to the predetermined threshold.

8. The method of claim 1, wherein activating the primary or secondary brake systems includes activating the primary or secondary chassis domain controller to issue the commands to either the primary or secondary brake system.

9. The method of claim 1, wherein activating the primary or secondary brake system includes activating the primary or secondary by-wire systems.

10. The method of claim 1, wherein the primary or secondary by-wire systems include a primary or a secondary steer by-wire system, a primary or a secondary throttle by-wire system, or a primary or a secondary transmission-by-wire system.

11. The method of claim 1, wherein the primary or secondary brake system includes a primary or a secondary brake by-wire system.

12. A non-transitory machine-readable medium having instructions stored therein, which when executed by a processor, cause the processor to perform operations, the operations comprising:
    determining activation parameters for an autonomous driving vehicle (ADV), wherein the activation parameters include historical usages of a primary brake system or a secondary brake system;
    in response to determining that a brake is to be applied, determining whether to activate a primary or a secondary brake system based on the activation parameters;
    sending an activation flag to activate the primary or the secondary brake system based on the determining whether to activate the primary or the secondary brake system; and
    sending a brake command to the primary and the secondary brake system to activate either the primary or the secondary brake system according to the activation flag.

13. The machine-readable medium of claim 12, wherein the activation parameters include a plurality of external safety factors including a count of passengers in the ADV, a safety status of an environment surrounding the ADV, or a vehicular status of the ADV.

14. The machine-readable medium of claim 13, wherein a safety status of the environment surrounding the ADV includes a traction of a road of the ADV, weather, or a slope of the road.

15. The machine-readable medium of claim 13, wherein the vehicle status of the ADV includes a current speed, a weight of the ADV, a health status of an autonomous driving system (ADS) of the ADV, or a health status of the primary or secondary brake system, or a tire traction of the ADV.

16. The machine-readable medium of claim 12, wherein the activation parameters further comprise a failure rate of an autonomous driving system (ADS) of the ADV.

17. A data processing system, comprising:
a processor; and
a memory coupled to the processor to store instructions, which when executed by the processor, cause the processor to perform operations, the operations including
determining activation parameters for an autonomous driving vehicle (ADV), wherein the activation parameters include historical usages of a primary brake system or a secondary brake system;
in response to determining that a brake is to be applied, determining whether to activate a primary or a secondary brake system based on the activation parameters;
sending an activation flag to activate the primary or the secondary brake system based on the determining whether to activate the primary or the secondary brake system; and
sending a brake command to the primary and the secondary brake system to activate either the primary or the secondary brake system according to the activation flag.

18. The system of claim 17, wherein the activation parameters include a plurality of external safety factors including a count of passengers in the ADV, a safety status of an environment surrounding the ADV, or a vehicular status of the ADV.

19. The system of claim 18, wherein a safety status of the environment surrounding the ADV includes a traction of a road of the ADV, weather, or a slope of the road.

20. The system of claim 18, wherein the vehicle status of the ADV includes a current speed, a weight of the ADV, a health status of an autonomous driving system (ADS) of the ADV, or a health status of the primary or secondary brake system, or a tire traction of the ADV.

* * * * *